(12) United States Patent
Scarlata

(10) Patent No.: US 9,483,662 B2
(45) Date of Patent: *Nov. 1, 2016

(54) METHOD AND APPARATUS FOR REMOTELY PROVISIONING SOFTWARE-BASED SECURITY COPROCESSORS

(71) Applicant: INTEL CORPORATION, Santa Clara, CA (US)

(72) Inventor: Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,925

(22) Filed: May 28, 2015

(65) Prior Publication Data

US 2015/0261977 A1    Sep. 17, 2015

Related U.S. Application Data

(63) Continuation of application No. 14/600,182, filed on Jan. 20, 2015, now Pat. No. 9,298,948, which is a continuation of application No. 14/141,131, filed on Dec. 26, 2013, now Pat. No. 8,953,807, which is a (Continued)

(51) Int. Cl.
*G06F 21/72* (2013.01)
*G06F 21/57* (2013.01)
(Continued)

(52) U.S. Cl.
CPC ......... *G06F 21/72* (2013.01); *G06F 9/45533* (2013.01); *G06F 9/45558* (2013.01); *G06F 21/00* (2013.01); *G06F 21/57* (2013.01);
*G06F 21/602* (2013.01); *H04L 9/08* (2013.01);
*H04L 9/0825* (2013.01); *H04L 9/0897* (2013.01); *H04L 63/0428* (2013.01); *H04L 67/10* (2013.01); *G06F 2009/4557* (2013.01);
(Continued)

(58) Field of Classification Search
CPC combination set(s) only.
See application file for complete search history.

(56) References Cited

U.S. PATENT DOCUMENTS 6,813,703 B2  11/2004  Nishikawa et al.
6,895,501 B1   5/2005  Salowey
(Continued)

FOREIGN PATENT DOCUMENTS

WO         0206929 A2     1/2002

OTHER PUBLICATIONS

U.S. Appl. No. 14/670,783, filed Mar. 27, 2015, entitled "Method and Apparatus for Remotely Provisioning Software-Based Security Coprocessors," by Vincent R. Scarlata.

(Continued)

*Primary Examiner* — Beemnet Dada
(74) *Attorney, Agent, or Firm* — Trop, Pruner & Hu, P.C.

(57) ABSTRACT

A virtual security coprocessor is created in a first processing system. The virtual security coprocessor is then transferred to a second processing system, for use by the second processing system. For instance, the second processing system may use the virtual security coprocessor to provide attestation for the second processing system. In an alternative embodiment, a virtual security coprocessor from a first processing system is received at a second processing system. After receiving the virtual security coprocessor from the first processing system, the second processing system uses the virtual security coprocessor. Other embodiments are described and claimed.

20 Claims, 5 Drawing Sheets

Related U.S. Application Data continuation of application No. 14/039,440, filed on Sep. 27, 2013, now Pat. No. 8,953,806, which is a continuation of application No. 13/253,508, filed on Oct. 5, 2011, now Pat. No. 8,565,437, which is a continuation of application No. 12/563,212, filed on Sep. 21, 2009, now Pat. No. 8,068,613, which is a continuation of application No. 11/171,880, filed on Jun. 29, 2005, now Pat. No. 7,613,921.

(60) Provisional application No. 60/681,094, filed on May 13, 2005.

(51) Int. Cl.
  *H04L 29/06* (2006.01)
  *G06F 9/455* (2006.01)
  *G06F 21/00* (2013.01)
  *H04L 9/08* (2006.01)
  *G06F 21/60* (2013.01)
  *H04L 29/08* (2006.01)

(52) U.S. Cl.
  CPC ............... *G06F2009/45583* (2013.01); *G06F 2009/45595* (2013.01)

(56) References Cited

U.S. PATENT DOCUMENTS

| | | |
|---|---|---|
| 6,922,774 B2 | 7/2005 | Meushaw et al. |
| 7,058,807 B2 | 6/2006 | Grawrock et al. |
| 7,076,655 B2 | 7/2006 | Griffin et al. |
| 7,177,967 B2 | 2/2007 | Jeyasingh et al. |
| 7,222,062 B2 | 5/2007 | Goud et al. |
| 7,380,119 B2 | 5/2008 | Bade et al. |
| 7,454,544 B2 | 11/2008 | Bond et al. |
| 7,478,233 B2 | 1/2009 | Olsen et al. |
| 7,512,815 B1 | 3/2009 | Munetoh |
| 7,552,419 B2 | 6/2009 | Zimmer et al. |
| 7,571,312 B2 | 8/2009 | Scarlata et al. |
| 7,587,595 B2 | 9/2009 | Scarlata et al. |
| 7,590,867 B2 | 9/2009 | Scarlata et al. |
| 7,613,921 B2 | 11/2009 | Scaralata |
| 8,068,613 B2 | 11/2011 | Scaralata |
| 2002/0193615 A1 | 12/2002 | Aksela et al. |
| 2002/0194482 A1 | 12/2002 | Griffin et al. |
| 2003/0023776 A1 | 1/2003 | Kolinummi et al. |
| 2003/0115453 A1 | 6/2003 | Grawrock |
| 2003/0115468 A1 | 6/2003 | Aull et al. |
| 2003/0226031 A1 | 12/2003 | Proudler et al. |
| 2003/0229485 A1 | 12/2003 | Nishikawa et al. |
| 2004/0031030 A1 | 2/2004 | Kidder et al. |
| 2004/0264797 A1 | 12/2004 | Lippincott et al. |
| 2005/0086509 A1 | 4/2005 | Ranganathan |
| 2005/0130611 A1 | 6/2005 | Lu et al. |
| 2005/0132122 A1 | 6/2005 | Rozas |
| 2005/0133582 A1 | 6/2005 | Bajikar |
| 2005/0138370 A1 | 6/2005 | Goud et al. |
| 2005/0144440 A1 | 6/2005 | Catherman et al. |
| 2005/0166024 A1 | 7/2005 | Angelo et al. |
| 2005/0246552 A1 | 11/2005 | Bade et al. |
| 2005/0286792 A1 | 12/2005 | Tadas et al. |
| 2006/0002471 A1 | 1/2006 | Lippincott et al. |
| 2006/0020781 A1 | 1/2006 | Scarlata et al. |
| 2006/0031436 A1 | 2/2006 | Sakata et al. |
| 2006/0075223 A1 | 4/2006 | Bade et al. |
| 2006/0140501 A1 | 6/2006 | Tadas |
| 2006/0190986 A1 | 8/2006 | Mont et al. |
| 2006/0230401 A1 | 10/2006 | Grawrock |
| 2006/0256106 A1 | 11/2006 | Scarlata |
| 2006/0256107 A1 | 11/2006 | Scarlata |
| 2006/0256108 A1 | 11/2006 | Scarlata |
| 2007/0043896 A1 | 2/2007 | Daruwala et al. |
| 2007/0094719 A1 | 4/2007 | Scarlata |
| 2007/0226786 A1 | 9/2007 | Berger et al. |
| 2007/0256125 A1 | 11/2007 | Chen |
| 2007/0300069 A1 | 12/2007 | Rozas |
| 2008/0282348 A1 | 11/2008 | Proudler et al. |
| 2009/0169012 A1 | 7/2009 | Smith et al. |

OTHER PUBLICATIONS

U.S. Appl. No. 14/723,937, filed May 28, 2015, entitled "Method and Apparatus for Remotely Provisioning Software-Based Security Coprocessors," by Vincent R. Scarlata.

U.S. Appl. No. 14/723,910, filed May 28, 2015, entitled "Method and Apparatus for Remotely Provisioning Software-Based Security Coprocessors," by Vincent R. Scarlata.

U.S. Trademark and Patent Office, Office Action mailed Aug. 13, 2015 in U.S. Appl. No. 14/670,783.

U.S. Trademark and Patent Office, Office Action mailed Aug. 18, 2015 in U.S. Appl. No. 14/600,182.

Ulich Kuhn, et al., "Secure Data Management in Trusted Computing," Aug. 29-Sep. 1, 2005, 15 pages.

Request for Continued Examination (RCE) filed on Aug. 29, 2011 in U.S. Appl. No. 11/474,778.

U.S. Patent and Trademark Office, Notice of Allowance Mailed Sep. 1, 2011 in U.S. Appl. No. 11/512,989.

U.S. Patent and Trademark Office, Final Office Action mailed Jul. 1, 2011 in U.S. Appl. No. 11/474,778.

U.S. Appl. No. 11/512,989 Reply to Office Action mailed Mar. 21, 2011 filed on Jun. 23, 2011.

U.S. Patent and Trademark Office, Office Action mailed Feb. 2, 2011 with Reply filed May 2, 2011 in U.S. Appl. No. 11/474,778.

U.S. Patent and Trademark Office, Non-Final Office Action mailed Mar. 21, 2011 in U.S. Appl. No. 11/512,989.

U.S. Patent and Trademark Office, Office Action mailed Aug. 17, 2010 with Reply filed on Nov. 17, 2010 in U.S. Appl. No. 11/474,778.

U.S. Patent and Trademark Office, Final Office Action mailed Aug. 13, 2010 and RCE filed Nov. 11, 2010 in U.S. Appl. No. 11/512,989.

U.S. Patent and Trademark Office, Office Action Mailed Oct. 7, 2009 with Reply Filed on Jan. 7, 2010, in U.S. Appl. No. 11/474,778.

U.S. Patent and Trademark Office, Final Office Action Mailed Mar. 19, 2010 with RCE Filed on Jun. 18, 2010, In U.S. Appl. No. 11/474,778.

U.S. Patent and Trademark Office, Office Action mailed Mar. 10, 2010 with Reply filed on Jun. 9, 2010, in U.S. Appl. No. 11/512,989.

Petroni et al., "Capilor—a Coprocessor•based Kernal Runtime Integrity Monitor", Proceedings of the 13th USENIX Security Symposium, San Diego, CA, Aug. 9-13, 2004, 17 pgs.

Mario Strasser, "A Software-based TPM Emulator for Linux", Semester Thesis Eldgenssisohe Technische Hoohschule Zurich, Jul. 2004, Zurich, Swizerland, 52 pgs.

David Grawrock et al., "The Intel Safer Computing Initiate", Jan. 2006, 282 pgs.

TPM Main, Part 1: Design Principles, Specification Version 1.2, Revision 94, Mar. 29, 2006, Trusted Computing Group, TCG Published 2003-2006, 180 pgs.

Charles S. Powell et al., "Foundations for Trusted Computing", Infineon Technologies AB, London, England, Nov. 7, 2002, 87 pgs.

N. Sumrall et al., Trusted Computing Group (TCG)and the TFM 1.2 Specification, Intel Developer Forum, 32 pgs.

Trusted Computing Platform Alliance (TCPA) Main Specification, Version 1.1b, Trusted Computing Group, 2003, 332 pgs.

Intel Corp., "Intel Trusted Execution Technology", Preliminary Architecture Specification, Nov. 2006, 104 pgs.

Ahmad-Reza Sadeghi et al., "Propertybased Attestation for Computing Platforms: Caring about properties, not mechanisms", 2004, pp. 67-77.

Carlos Rozas et al., "Dynamic Measurement of an Operating System in a Virtualized System", U.S. Appl. No. 11/513,963, filed Aug. 31, 2006.

Stefan Berger et al., "vTPM: Virtualizing the Trusted Platform Module", Security '06: 15th USENIX Security Symposium, pp. 305-320.

(56) References Cited

OTHER PUBLICATIONS

Carlos Rozas et al., "Methods and Apparatus for Remeasuring a Virtual Machine Monitor", U.S. Appl. No. 11/648,103, filed Dec. 29, 2006.
U.S. Appl. No. 11/095,034, filed Mar. 31, 2005, Grawock.
U.S. Appl. No. 10/876,994, filed Jun. 24, 2004, Razas et al.
Method and Apparatus for Migrating Software-Based Security Coprocessors Inventors: Vincent R. Scarlata Carlos V. Rozas.
Method and Apparatus for Generating Endorsement Credentials for Software-based Security Coprocessors Inventors: Vincent R. Scarlata Willard M. Wiseman.
Method and Apparatus for Providing Software-Based Security Coprocessors Inventors: Vincent R. Scarlara Carlos V. Rozas.
http://www.prosec.rub.de/trusted_grub.html—"Trusted grub".
http://www.vmware.com/news/releases/ace_announce.html—"VMware Reinvents Enterprise Desktop Management and Security with Breakthrough New Product".
http://www.cl.cam.ac.uk/Research/SRG/netos/papers/2003-xensosp.pdf—"Xen and the Art of Virtualization".
http://www.eecs.umich.edu/CoVirt/papers/revirt.pdf—"ReVirt: Enabling Intrusion Analysis through Virtual-Machine Logging and Replay".
http://ieeexplore.ieee.org/iel5/2/20660/00955100.pdf?arnumber=955100—"Building the IBM 4758 Secure Coprocessor".
http://www.cl.cam.ac.uk/Research/SRG/netos/papers/2004-oasis-ngio.pdf—"Safe Harware Access with the Xen Virtual Machine Monitor".
http://www.cs.utexas.edu/~shmat/courses/cs395t_fall04/tager.pdf—"TERRA: A Virtual Machine-Based Platform for Trusted Computing" (presentation).
https://www.trustedcomputinggroup.org/home—"What is the Trusted Computing Group?" (Internet home page).
http://www.cs.dartmouth.edu/~aws/papers/mswm03.pdf—"Experimenting with TCPA/TCG Hardware".
http://www.vmware.com/pdf/TechTrendNotes.pdf—"NetTop: Commercial Technology in High Assurance Applications".
http://www.research.ibm.com/gsal/tcpa/why_tcpa.pdf—"The Need for TCPA".
http://www.ece.cmu.edu/~adrian/630-f04/readings/sailer-zhang-jaeger-doom-2004.pdf—"Design and Implementation of TCG-based Integrity Measurement Architecture".
http://www.cs.rochester.edu/soap2003/papers/p116-swift.pdf—"Improving the Reliability of Commodity Operating Systems".
http://www.stanford.edu/~talg/papers/SOSP03/terra.pdf—"Terra: A Virtual Machine-Based Platform for Trusted Computing" (article).
U.S. Patent and Trademark Office, Reply filed on Nov. 11, 2015 in U.S. Appl. No. 14/600,182.
U.S. Patent and Trademark Office, Reply filed on Nov. 11, 2015 in U.S. Appl. No. 14/670,783.
United States Patent and Trademark Office, Reply to Non-Final Office Action filed on Jun. 6, 2016 in U.S. Appl. No. 14/723,910.
United States Patent and Trademark Office, Reply to Non-Final Office Action filed on Jun. 6, 2016 in U.S. Appl. No. 14/723,937.
United States Patent and Trademark Office, Non-Final Office Action mailed Mar. 9, 2016 in U.S. Appl. No. 14/723,910.
United States Patent and Trademark Office, Non-Final Office Action mailed Mar. 8, 2016 in U.S. Appl. No. 14/723,937.

METHOD AND APPARATUS FOR REMOTELY PROVISIONING SOFTWARE-BASED SECURITY COPROCESSORS

This application is a continuation of U.S. patent application Ser. No. 14/600,182, filed Jan. 20, 2015, which is a continuation of U.S. patent application Ser. No. 14/141,131, filed Dec. 26, 2013, now U.S. Pat. No. 8,953,807, issued Feb. 10, 2015, which is a continuation of U.S. patent application Ser. No. 14/039,440, filed Sep. 27, 2013, now U.S. Pat. No. 8,953,806, issued Feb. 10, 2015, which is a continuation of U.S. patent application Ser. No. 13/253,508, filed Oct. 5, 2011, now U.S. Pat. No. 8,565,437, issued on Oct. 22, 2013, which is a continuation of U.S. patent application Ser. No. 12/563,212, filed Sep. 21, 2009, now U.S. Pat. No. 8,068,613, issued Nov. 29, 2011, which is a continuation of U.S. patent application Ser. No. 11/171,880, filed Jun. 29, 2005, now U.S. Pat. No. 7,613,921, issued on Nov. 3, 2009, which claims the benefit of U.S. Provisional Application No. 60/681,094, filed on May 13, 2005, the content of which is hereby incorporated by reference.

FIELD OF THE INVENTION

The present disclosure relates generally to the field of data processing, and more particularly to methods and related apparatus to support secure virtualization.

BACKGROUND

A conventional processing system may include hardware resources, such as a central processing unit (CPU) and random access memory (RAM), as well as software resources, such as an operating system (OS) and one or more end-user programs or applications. An application is typically developed to run on a particular OS. When a typical conventional computer system is started, it loads the OS before loading the end-user programs or applications. The OS typically serves as an intermediary between software applications and the hardware in a processing system.

In addition to RAM and one or more CPUs, a processing system may include a security coprocessor (SC) such as a trusted platform module (TPM). A TPM is a hardware component that resides within a processing system and provides various facilities and services for enhancing the security of the processing system. For example, a TPM may be implemented as an integrated circuit (IC) or semiconductor chip, and it may be used to protect data and to attest to the configuration of a platform.

A TPM may be implemented in accordance with specifications such as the Trusted Computing Group (TCG) TPM Specification Version 1.2, dated Oct. 2, 2003 (hereinafter the "TPM specification"), which includes parts such as Design Principles, Structures of the TPM, and TPM Commands. The TPM specification is published by the TCG and is available from the Internet at www.trustedcomputing-group.org/home.

The sub-components of a TPM may include an execution engine and secure non-volatile (NV) memory or storage. The secure NV memory is used to store sensitive information, such as encryption keys, and the execution engine protects the sensitive information according to the security policies dictated by the TPM's control logic.

In general, a TCG-compliant TPM provides security services such as attesting to the identity and/or integrity of the platform, based on characteristics of the platform. The platform characteristics typically considered by a TPM include hardware components of the platform, such as the processor(s) and chipset, as well as the software residing in the platform, such as the firmware and OS. A TPM may also support auditing and logging of software processes, as well as verification of platform boot integrity, file integrity, and software licensing. It may therefore be said that a TPM provides a root of trust for a platform.

Accordingly, when a processing system such as a server handles requests from other processing systems such as clients, the server may enforce security policies based on TPM-based attestation. For instance, the server may be configured to deny requests from any client system unless those requests are accompanied by valid, TPM-based platform attestation from that client system. When a conventional processing system uses a TPM, however, that processing system may be able to support only one software environment at a time.

Virtualization products provide features for partitioning a processing system into multiple virtual machines (VMs). For instance, virtualization products may partition and manage a processing system's hardware resources in a way that allows multiple OSs to execute on the same machine concurrently. Specifically, each OS may run in a different VM. Each VM may therefore be considered a substantially independent software environment. An OS running in a VM may be referred to as a guest OS. The VMs may be managed by virtualization products such as a virtual machine monitor (VMM) or hypervisor.

As recognized by the present invention, it would be advantageous if a VMM could allow each of the OSs to operate substantially as if that OS were in its own independent physical machine. U.S. patent application Ser. No. 10/876,944 ("the '944 application"), which is assigned to the same entity as the present application, discusses features to support use of TPMs by VMs. The present application discloses additional features and capabilities relating to TPMs and virtualization.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Platform partitioning technologies, such as technologies for creating VMs, have recently received increased attention for their potential security value. Virtualization technologies allow a platform to be split into VMs, with each VM possibly running less software than today's complex platforms. Separately, as indicated above, the TCG has provided a standard for hardware augmented security to facilitate the creation of processing systems that can be classified as trusted platforms. A TPM may provide the root of trust for a trusted platform.

It would be advantageous if all software in a given VM could be identified, and if a TPM could meaningfully attest to all software in that VM. However, sharing a TPM for use by multiple VMs is difficult, at least in part because of the stateful and opaque nature of the TPM.

A well-written VMM should prevent malicious software running in one VM from tampering with software running in another VM. Additionally, using the TCG trusted boot model, it would be advantageous if a TPM could measure the OS and applications in each VM to provide data protection for the OS and applications as well as to facilitate attestation to remote entities.

Unfortunately, the measurement facilities of the TPM are designed to store the measurements of exactly one operating system. Conventional TPMs lack the ability to separately store measurements of multiple concurrently running OSs. Furthermore, due to the closed, smartcard-like nature of the TPM, its state cannot be read or swapped out. As a result, traditional techniques for device sharing or virtualization cannot be used for TPMs.

Figure 1:
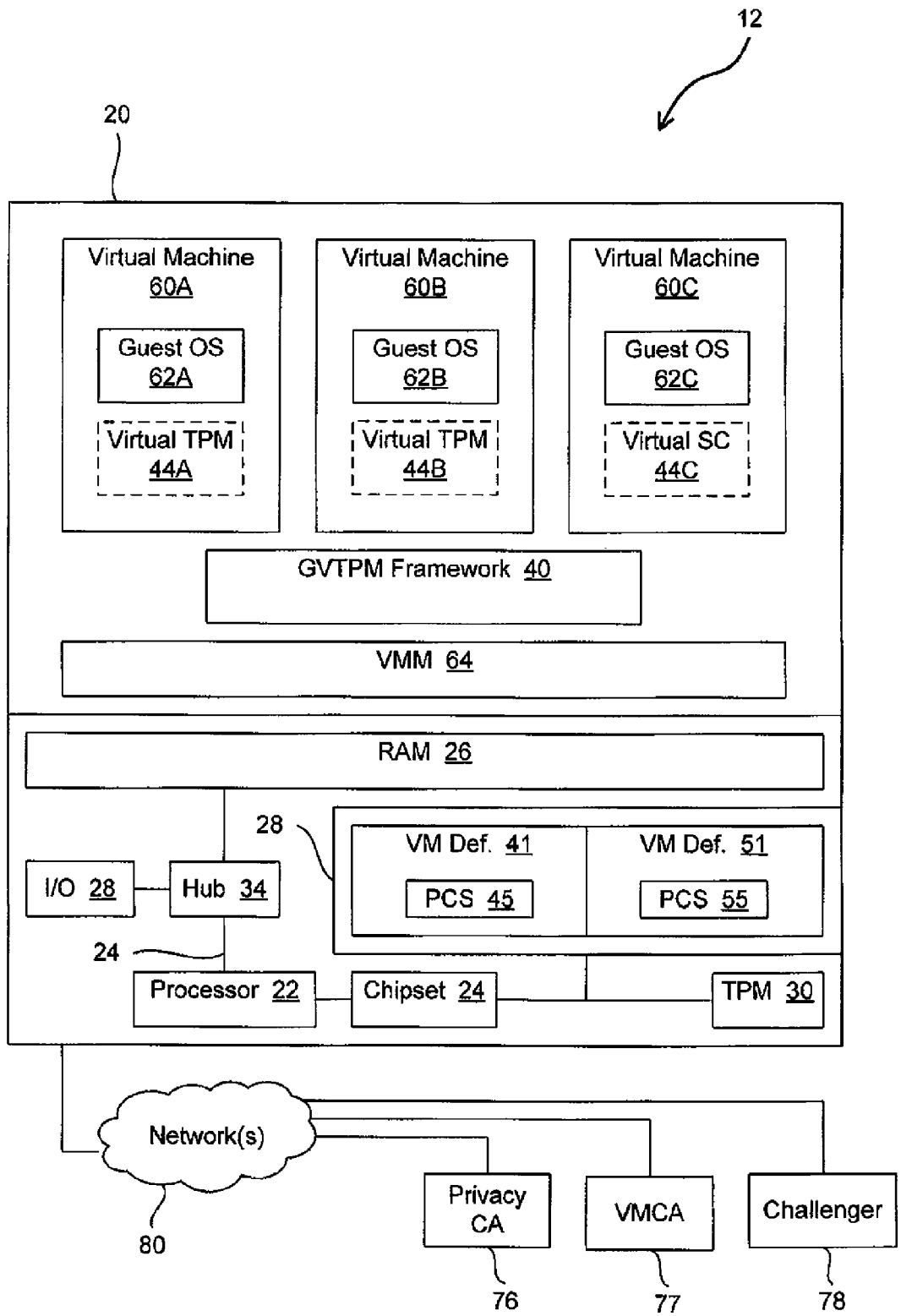
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes one or more processors or central processing units (CPUs) 22 communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as keyboards, mice, etc., and/or by directives received from another machine, biometric feedback, or other input sources or signals. Processing system 20 may utilize one or more connections to one or more remote data processing systems 76-78, such as through a network interface controller (NIC), a modem, or other communication ports or couplings. Processing systems may be interconnected by way of a physical and/or logical network 80, such as a local area network (LAN), a wide area network (WAN), an intranet, the Internet, etc. Communications involving network 80 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 20, processor 22 may be communicatively coupled to one or more volatile or non-volatile data storage devices, such as random access memory (RAM) 26, read-only memory (ROM), mass storage devices such as integrated drive electronics (IDE) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, small computer system interface (SCSI) controllers, network controllers, universal serial bus (USB) controllers, input devices such as a keyboard and mouse, etc. Processing system 20 may also include one or more bridges or hubs 34, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as a NIC for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As illustrated, processing system 20 also includes a TPM 30 communicatively coupled to processor 24. TPM 30 may also be referred to as a physical TPM or hardware TPM (hwTPM) 30. In one embodiment, TPM 30 is implemented as an embedded device, residing on a system motherboard or backplane of processing system 20. TPM 30 includes several storage facilities, including volatile platform configuration registers (PCRs) and authorization sessions, as well as persistent data integrity registers (DIRs), authorization digests, and general use persistent storage. Each of these facilities may have a corresponding in-memory data structure.

The invention may be described by reference to or in conjunction with associated data including instructions, functions, procedures, data structures, application programs, etc., which, when accessed by a machine, result in the machine performing tasks or defining abstract data types or low-level hardware contexts. The data may be stored in volatile and/or non-volatile data storage.

For instance, RAM 26 may include one or more sets of instructions which, when executed, implement a generalized virtual TPM (GVTPM) framework 40 to support secure virtualization of TPM 30. GVTPM framework 40 may also be referred to as a virtual TPM service. For purposes of this disclosure, a virtual TPM (vTPM) is a logical (i.e., primarily software-implemented) component that provides TPM-like functionality. Likewise, a virtual security coprocessor (vSC) is a logical device which provides functionality like that which could potentially be provided by a hardware security coprocessor.

In one example embodiment, GVTPM framework 40 may operate partially or completely from within a VMM 64. In another embodiment, GVTPM framework 40 resides in one or more service VMs supported by the VMM. The service VMs may be referred to as lightweight VMs, since they may require fewer resources than a VM with a guest OS. In alternative embodiments, some or all of the modules for GVTPM framework 40 may reside in the firmware or any other protected environment. Different embodiments of the GVTPM framework may provide virtual TPM services for a wide variety of VMM architectures. In other embodiments, GVTPM framework 40 may not be part of a VMM at all.

Figure 3:
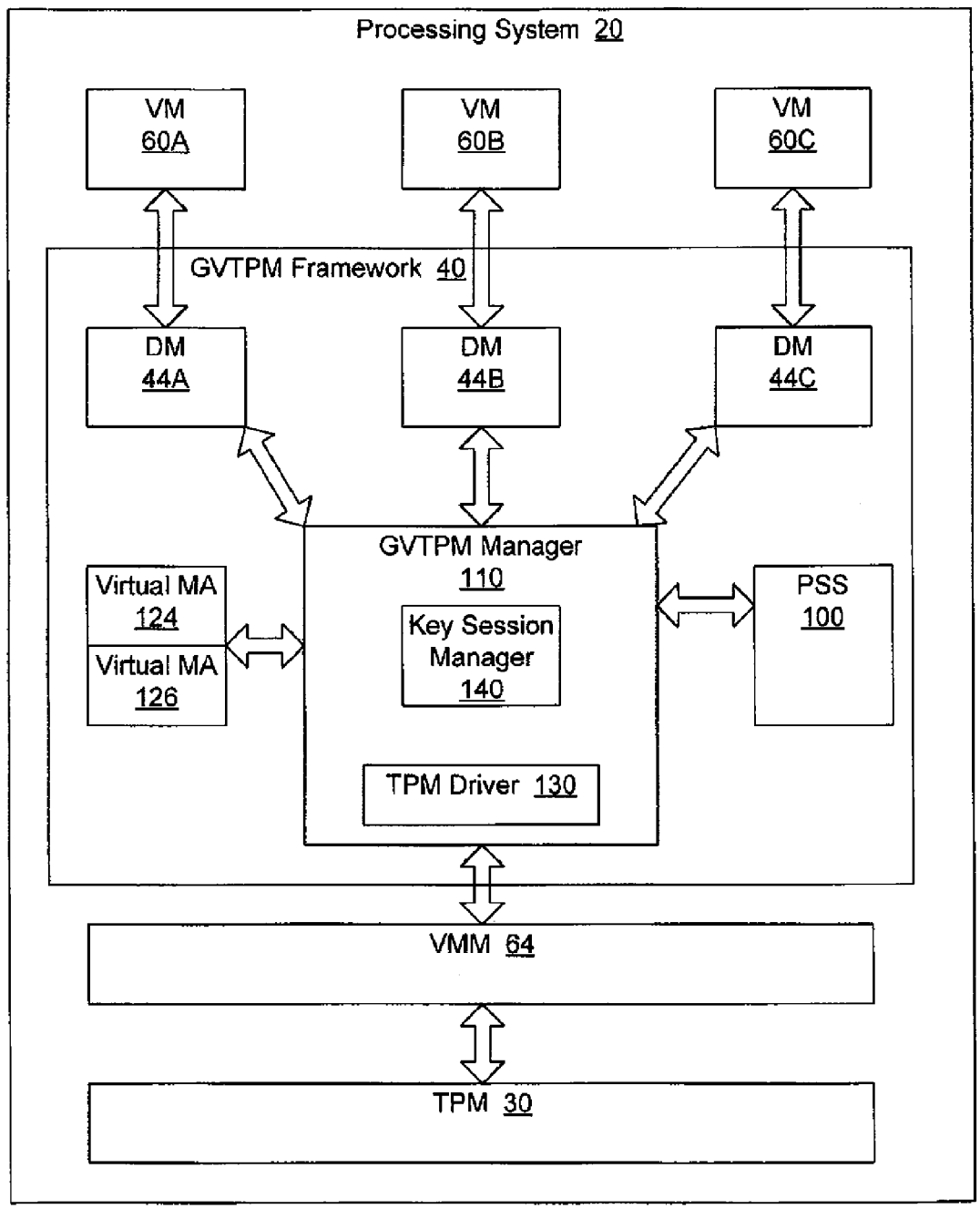
FIG. 3 is a block diagram showing various components of an example generalized virtual TPM framework and related items.

In the example embodiment, processing system 20 may load VMM 64 into RAM 26 at boot time or at some later time to support one or more VMs 60A-60C within processing system 20. VMM 64 may be implemented through execution of software or firmware components such as a micro-kernel and a service OS. The micro-kernel may include a small nucleus of instructions for system management tasks such as instruction scheduling. The service OS may include device drivers and environment virtualization software for creating and maintaining VMs. The device drivers in the service OS may include a TPM driver for communicating with TPM 30. Alternatively, as illustrated in FIG. 3, the TPM driver 130 may be loaded into a different software component, such GVTPM manager 110. Processing system 20 may load the instructions that implement VMM 64 and GVTPM framework 40 from ROM and/or from one or more local or remote mass storage devices, for instance. Any additional instructions used to support or facilitate TPM virtualization may also be loaded from ROM and/or from one or more local or remote mass storage devices, for instance. In the example embodiment, VMM 64 supports multiple VMs 60A-60C, each running its own independent guest OS. One or more of the VMs may run a trusted software stack or TCG software stack (TSS), in compliance with TCG standards.

For purposes of this disclosure, vTPMs, proprietary vSCs, and similar virtual devices may be referred to as device models (DMs). In the example embodiment, such device models are supported by GVTPM framework 40. In addition, GVTPM framework 40 may support multiple DM designs. For example, as described in greater detail below with regard to FIG. 3, GVTPM framework 40 may create vTPMs based on one DM design, and GVTPM framework 40 may create proprietary vSCs based on another DM design. Thus different DM designs may be used to facilitate virtualization of different types of security coprocessors. GVTPM framework 40 may thus support vTPMs and other vSCs with different security and performance tradeoffs. Since the vSCs are not limited to vTPMs, GVTPM framework 40 may also be referred to as a virtual security coprocessor (vSC) framework.

As illustrated in FIG. 1, in one embodiment, processing system 20 includes a data storage device 28 containing one or more VM definitions 41, 51. In one embodiment, the VM definitions may reside on a hard disk drive (HDD). In alternative embodiments, the VM definitions may reside in other types of storage devices. For instance, VM definitions may be retrieved from a remote system and loaded into RAM 26 or into cache memory of processor 22. A VM definition may define the attributes to be included in a virtual machine. For instance, when VMM 64 determines that is should create VM 60A, processing system 20 may treat VM definition 41 like a boot block, with GVTPM framework 40 measuring VM definition 41, and then VMM 64 passing control to initialization instructions or boot code within VM definition 41. VM 60A may be instantiated, at least in part, through execution of that boot code. In particular, vTPM 44A may be created for VM 60A based in control logic and/or initialization data within VM definition 41. As described in greater detail below, that control logic may constitute or include the program code segment (PCS) 45 for implementing vTPMs. Similarly, VM definition 51 with the corresponding PCS 55 may be used to create VM 60C and the corresponding vSC 44C.

In the example embodiment, GVTPM framework 40 operates from protected host memory. For example, processing system 20 may use technology such as that described in U.S. Pat. Nos. 6,507,904; 6,633,963; and/or 6,678,825 (all assigned to Intel Corporation) to load GVTPM framework 40 into, and execute GVTPM framework 40 from, an isolated area of memory that is protected by hardware from access or tampering from software in other partitions. In alternative embodiments, other techniques may be used to provide protected memory. For instance, an environment may include a system management mode (SMM) that provides protected memory, or a protected execution environment could be created using a tamper-resistant software compiler. Other components (e.g., VMM 64, the microkernel, etc.) may also reside in protected memory areas. In the example embodiment, the protected memory ensures that the software/instructions can run without interference or observation.

The protected memory may also serve to prevent unauthorized programs from accessing or tampering with sensitive information. For example, as described in greater detail below, GVTPM framework 40 may create a virtual TPM 44A to emulate a hardware TPM for VM 60A. GVTPM framework 40 may use protected memory to store and protect data stored in structures of vTPM 44A.

As illustrated in FIG. 3, GVTPM framework 40 may include a protected storage service (PSS) 100, and PSS 100 may use TPM 30 to protect vTPMs even when the vTPMs are not running. For example, when a vTPM is not actively operating, persistent data structures for that vTPM may be stored on disk and sealed to the PCRs of the vTPM service with the parent SRK.

In the example embodiment, vTPM 44A is able to transparently provide TPM functionality both from itself and from hwTPM 30 under a single user authorization session. The vTPM 44A accomplishes this objective by maintaining separate authorization sessions with both the user and the hwTPM. That is, the user will create an authorization session with vTPM 44A as if vTPM 44a were a hwTPM. The vTPM 44A may complete all the same authorization checks based on this session that a hwTPM would do. If vTPM 44A can provide a requested function directly, vTPM 44A may simply update the session nonces and reply back. If vTPM 44A needs the hwTPM to provide the service, vTPM 44A will create an authorization session or reuse an existing authorization session with the hwTPM to make the request. Once vTPM 44A is done using the hwTPM, vTPM 44A may update the nonces on the user's session and reply back.

In the example embodiment, GVTPM framework 40 provides an execution environment for trustworthy virtual TPMs (vTPMs) 44A and 44B, and/or for other TPM-like virtual components, such as vSC 44C. In order to protect sensitive data used by vSCs 44A-44C, GVTPM framework 40 uses TPM 30 to ensure that the trustworthiness of the vSCs are anchored in hardware that meets the expectation of software that uses a TPM. For purposes of this disclosure, the terms virtual TPM and vTPM are used to refer to software emulations or simulations of physical TPMs, as well as software emulations of similar kinds of security subsystems.

GVTPM framework 40 may allow multiple mutually distrustful and/or unaware guests to share the TPM without requiring modifications to guest OSs or to applications running on guest OSs. Additionally, GVTPM framework 40 may include features to provide the necessary environment for creating custom cryptographic subsystems with enhanced proprietary functionality. This disclosure also describes additional TPM features for optimizing virtualization under frameworks such as GVTPM framework 40.

The remainder of this detailed description of one or more example embodiments proceeds as follows: The Security Background section provides background on the TPM. The Generalized Virtual TPM Framework section discussed an example framework. The Example vTPM Device Model Designs section describes two example vTPM designs or design models. The Hardware Optimizations section describes example hardware features that may facilitate TPM virtualization. Next are sections on Remote Deployment and Provisioning of Virtual TPMs and on Migrating Virtual TPMs.

1.0—Security Background 1.1—TPM Functional Introduction

The industry consortium TCG has standardized the TPM as a small cryptographic subsystem that promises to provide a foundation for trust on a platform. To this end, the TPM provides functions to facilitate attestation and protected storage.

The core of the TPM's functionality lies in its ability to store information about the platform's configuration. This information can then be used for both of the TPM's primary functions. The platform can provide information to a remote entity necessary to allow the remote entity to make decisions about the trustworthiness of the platform. The platform can also instruct the TPM to ensure that keys or sensitive data are only released while the system is in a known "good" configuration.

In order to store the platform state, a conventional TPM uses the PCRs to store measurements in the form of 160-bit SHA1 (secure hashing algorithm 1) hashes of software and configuration information for the platform. These measurements start at the boot block. Each boot component measures the next, records it in the TPM, and then launches that component until the operating system takes over the measurement of its core. Because each write to the PCRs adds a measurement to the register, rather than overwriting the previous measurement, no entity can change the measurement of its code made by the preceding component. Thus, a chain of measurements is made, such that if the beginning of the chain (known as the Root of Trust for Measurement) and each link are trustworthy, the entire chain is trustworthy.

1.2—Attestation

Attestation refers to the set of TPM functions and protocols that enable the platform to report its configuration to a remote party in a trustworthy manner. For example, the TPM provides the ability to sign the PCRs used to store the platform state. For instance, a platform may use an attestation identity key (AIK) to sign the PCRs. Such signed PCRs may be referred to as a quote.

To provide proof to a remote entity that the quote was signed by a real TPM, each TPM has a set of credentials. For instance, an endorsement credential signed by the TPM manufacturer states that the TPM meets the TPM specification. The manufacturer also stores a unique key known as the endorsement key (EK) in the TPM, and the manufacturer uses the EK to sign the endorsement credential. Theoretically, the EK could be used directly to sign a quote of the PCRs. However, since the EK is unique, a third party is used instead, to provide privacy. Specifically, the platform uses a third party known as the privacy certification authority (CA) to create an identity credential for each AIK. TCG has defined a protocol that allows the TPM to prove to the privacy CA that the TPM is a real TPM, using the EK and the endorsement credential. In turn, the privacy CA creates identity credentials for AIKs that the TPM claims it owns.

Assuming a remote entity trusts the manufacturer of the TPM, the privacy CA, and the root of trust for measurement, a quote signed by an AIK that is accompanied by an identity credential is cryptographic proof of the current state of the platform. For example, if a conventional attestation approach were used in a network environment similar to that illustrated in FIG. 1, a remote processing system such as privacy CA 76 could provide an identity credential for an AIK of a conventional TPM, and processing system 20 could use that identity credential to make a trustworthiness assertion to a remote processing system such as challenger 78. As described in greater detail below, however, the present disclosure introduces a modified attestation approach to support virtual security processors or virtual TPMs for partitions such as virtual machines 60A-60C in devices such as processing system 20, for example.

Figure 2:
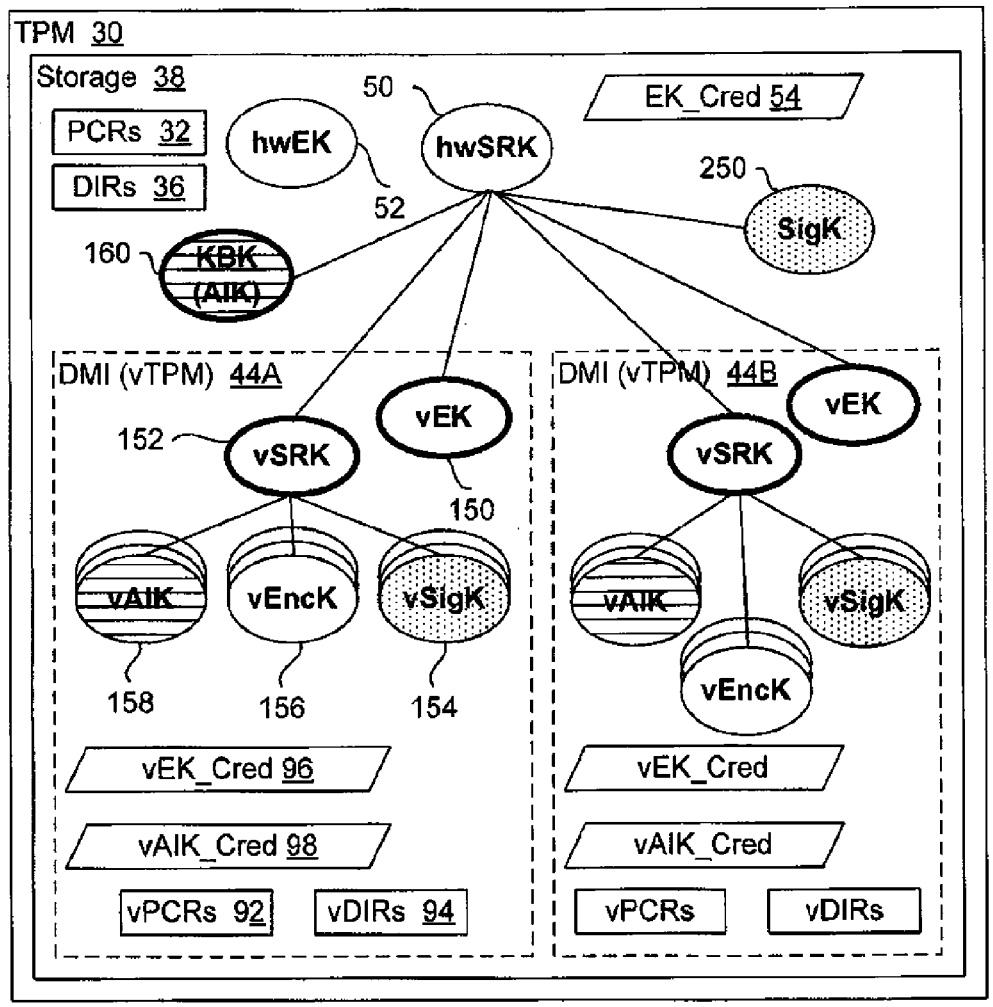
FIG. 2 presents a block diagram depicting an example TPM, with regard to various structures and keys to support functions such as TPM virtualization.
Figure 2:
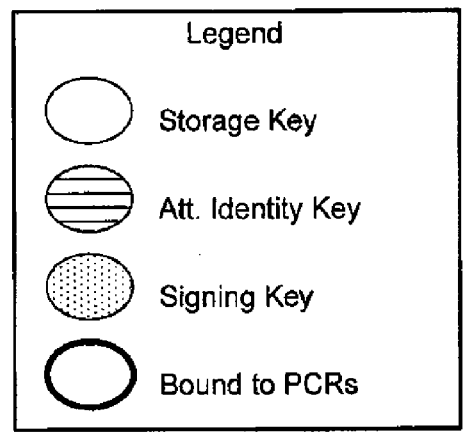

FIG. 2 is a block diagram depicting an example TPM, such as TPM 30, with regard to various structures and keys to support functions such as TPM virtualization. In FIG. 2, the EK of TPM 30 is illustrated as hwEK 52, the storage root key is illustrated as hwSRK 50, and the endorsement credential provided by the TPM manufacturer is illustrated as EK_Cred 54. FIG. 2 also depicts PCRs 32 and DIRs 36 within storage 38.

1.3—Secure Storage

Another set of services the TPM provides is the secure storage of keys and other data. The TPM can create Rivest-Shamir-Adleman (RSA) keys, which it will only allow use of once (a) the requester provides authorization via a secret SHA1 hash and (b) the current configuration, as determined by the PCRs, indicates a "good" state. This powerful function allows the platform to encrypt data such that, if the machine is compromised, booted from external media, or otherwise tampered with, the data will remain inaccessible.

To support services such as secure storage, the TPM creates keys with single-purpose types for different operations. The key of type EK is only available for decrypting identity credentials from the privacy CA. AIKs are used to sign other keys and to quote PCRs. Storage keys (SKs) are used to protect other keys or to "seal" data, which is a special encryption of data that protects the data with a password or PCR bindings. Binding keys (BKs) are used to encrypt arbitrary data, and to convert data into a TPM-bound data structure. Signing keys (SigKs) are used for signing arbitrary data. Lastly, legacy keys can sign or encrypt data and do not require that the data be in the form of a TPM-bound data structure.

Each TPM has two core keys, an EK and a special type of SK known as the storage root key (SRK). The SRK is the top of the hierarchy of keys that can be created by the system or users. This hierarchy is built on Storage Keys as branches and any of the other types, other than the EK type, as leaves. Of the keys in the hierarchy, only the SRK and EK are required to be loaded in the TPM at all times. Other keys may be stored outside the TPM encrypted as a "wrapped key," and loaded prior to use. Wrapped keys are described in greater detail below. Once a key is loaded, it can perform any functions, provided that the key type is correct for the operations, proper authorization is given, and the PCRs match any PCR binding specified by the key.

1.4—TPM Components

TPMs, smartcards, the model 4758 cryptographic coprocessor from International Business Machines Corp., and other similar devices or subsystems are, in essence, small self-contained computing environments which generally contain perimeter protections such as tamper resistance.

Consequently, such devices can be trusted to do certain computations without relying on external resources for operation.

A typical TPM includes the following four components.
1. Program code segment (PCS): The code segment of a TPM's control logic, which is typically in ROM and stored as read-only data.
2. Processor: A small CPU which executes the PCS.
3. Non-volatile memory (NV memory or NVM): The NVM is the storage within the TPM where persistent keys, secrets, and other state of the TPM are stored. It is typically located in tamper-resistant flash, which is preserved across restarts.
4. Active memory: This is the volatile memory used to store non-persistent data that is lost on power off.

The technical capabilities of devices built from these primitives are limited primarily by their internal resources. In practice, as a result of efforts to avoid high development and deployment costs, these devices typically include only a few simple, general purpose constructs for data protection. For example, in a typical device, simple encryption and decryption functions are available, but sophisticated access control policies are not. The framework disclosed herein alleviates this problem by providing computational areas which do not have the same resource constraints, and which are inexpensive to develop and deploy.

2.0—Generalized Virtual TPM Framework

FIG. 3 presents a block diagram showing various components of an example GVTPM framework and related items. In the illustrated embodiment, GVTPM framework 40 includes several components which help to provide various functional and security properties of the TPM components.

Also, the GVTPM PSS 100 serves as the central repository for the NVM of each DM, while the platform's CPU 22 and RAM 26 provide the processor and active memory resources. Since PSS 100 provides protected storage for the persistent data of each DM, PSS 100 may also be referred to as protected persistent storage. In the example embodiment, GVTPM framework 40 imposes a security requirement that the platform will isolate the use of CPU 22 and RAM 26 to ensure the framework is protected from the rest of the platform. One way to meet the isolation requirement is to implement the components in a trusted virtual machine monitor (TVMM) or use a TVMM to isolate GVTPM framework 40 in its own VM. In the example embodiment, VMM 64 is generally accepted as a TVMM. Alternative embodiments may not store the NVM within the PSS. The PSS may instead encrypt the NVM similar to that above and may return the NVM to the vSCs.

Additionally, a GVTPM manager 110 provides creation, deactivation, and other management functions for vSCs 44A-44C, and virtual manufacture authorities (MAs) 124, 126 are used to obtain credentials for vSCs 44A-44C. GVTPM framework 40 also includes a key and session manager 140, which GVTPM manager 110 uses for tasks such as swapping out keys and authorization sessions when one vTPM is unloaded from processor 22 and another vTPM is ready to become active. For instance, keys belonging to vTPMs which are loaded but not currently scheduled for execution on processor 22 may be removed to make room for the keys needed by a vTPM that is (or will soon be) scheduled to run on processor 22.

In the example embodiment, all components of GVTPM framework 40 are isolated from the rest of the system, in order to ensure the security of the secrets stored in these components.

2.1—GVTPM Device Models

GVTPM framework 40 may use VM definition 41 to create DMs 44A and 44B, and GVTPM framework 40 may use VM definition 51 to create DM 44C. GVTPM framework 40 may use virtualization events (VEs) when providing or using DMs. For instance, a VE may be triggered when software in VM 60A attempts to access a TPM. In response to the VE, control may be transferred from VM 60A to VMM 64. GVTPM manager 110 may intercept the VE to process the event by reference to vTPM 44A. In the example embodiment, although VM 60A may be unaware of any TPM other than vTPM 44A, GVTPM manager 110 may use hwTPM 30 to support vTPM 44A.

In effect, the DMs extend the GVTPM functionality to the OS partitions, such as VMs 60A-60C. The protection perimeter of each DM is provided by the environment it is executing in, such as the TVMM. By placing the perimeter around each GVTPM component and each DM individually, each DM maintains isolation in the event of another DM being compromised. Accordingly, the data structures implemented within the DM in accordance with the device model design may be considered tamper-resistant structures of the device model.

The design of the framework allows for flexibility in the design of device models. For example, any functionality allowed by the VMM may run in a DM, as opposed to the limited functionality supported by a typical hardware SC. In the case of proprietary functionality, the flexibility of the framework allows for a wide variety of encryption algorithms, signature schemes, access control policies, and storage mechanisms.

In the example embodiment, for virtual TPMs, each DM manages its own set of TPM structures and resources, including its own EK, SRK, PCRs, DIRs, monotonic counters, a user key hierarchy, general purpose NVM, etc. This enables the vTPM to function identically to a hardware TPM, ensuring that applications may use either hardware or virtual TPMs transparently.

In the example embodiment, vTPM 44A uses software to provide simulated, persistent, monotonic counters. The number of counters may be substantially unlimited. In the example embodiment, vTPM 44A at least provides the four counters expected from hwTPMs. The vTPM counters may not require any direct link to the hardware TPM counters.

Virtual PCRs such as vPCRs 92 do not have the resource constraints of hwTPMs, but instead may have a configurable number of PCRs available to them. In the example embodiment, vPCRs 92 are stored in the memory space of vTPM 44A in PSS 100, and vTPM 44A emulates the standard PCR operations on vPCRs 92.

The framework allows individual DM designs the ability to balance performance and security. Some implementations may enjoy faster encryption operations or enhanced migration by implementing keys in software within the DM, while others may require that all keys always reside in the hardware TPM and that the DM act as a portal to them. Additionally, this approach transparently allows different DM designs to tune their services to match the data protection and cryptography laws of different geographies.

As described in greater detail below, GVTPM manager 110 may provide a different virtual manufacturer authority (vMA) for each DM design. For instance, in FIG. 3, virtual manufacturer authority 124 services DMs based on the DM design provided by VM definition 41, and virtual manufacturer authority 126 services DMs based on the DM design provided by VM definition 51.

2.2—GVTPM Manager

GVTPM manager 110 is the central management component for GVTPM framework 40. In the example embodiment, GVTPM manager 110 is the management component responsible for vTPM provisioning, bridging the other framework components, and granting serialized access to TPM 30 for the DMs. In one embodiment, GVTPM manager 110 provisions new DMs by requesting that VMM 64 (a) create the necessary VMs and (b) provide communication channels. During the process of provisioning a new DM, GVTPM manager 110 will collect any information that PSS 100 requires to authenticate the DM, such as measurement of the DM code. For example, GVTPM manager 110 may measure the PCS within the particular VM definition that serves as the basis for instantiating the DM in question. For instance, VM definition 41 may include a PCS 45 for a particular type or model of TPM, while VM definition 51 may include a PCS 55 for a particular type or model of smartcard. In one embodiment, each different DM design to be supported by the processing system is defined completely or primarily by a PCS within a VM definition.

GVTPM manager 110 may provide communication channels between each particular OS partition and the respective DM. GVTPM manager 110 may also provide communication channels between itself and each DM. GVTPM manager 110 provides the DM access to other GVTPM components, such as access to a virtual manufacturer authority, access to PSS 100, and serialized access to hwTPM 30. GVTPM manager 110 is therefore in charge of sharing hwTPM 30 across multiple DMs. The primary resources under management are the set of loaded keys and authorization sessions. Sharing techniques such as those proposed in the Core Services portion of the TPM specification reference above may be fitting for this task.

In the example embodiment, GVTPM manager 110 ensures that only one vTPM accesses TPM 30 at a time. In addition, GVTPM manager 110 swaps keys and authorization sessions in and out of TPM 30 to ensure each vTPM has the resources it requires.

2.3—GVTPM Protected Storage Service

To maintain flexibility in the DMs, GVTPM framework 40 imposes relatively few requirements on how each DM functions. In one embodiment, the only requirement is that all persistent data (e.g., keys, counters, NVM data, and any other state the vTPM needs in order to function across system reboots) is copied from NVM to active memory on load, and then saved back to NVM when necessary. In accordance with this requirement, the PSS is responsible for protecting the DM's NVM while the DM is not operating. After the DM loads, it is the responsibility of the TVMM to provide isolation and protection of the data while the DM is executing.

In the example embodiment, PSS 100 authenticates the vTPM and ensures that the state of a vTPM is only loaded into the vTPM that stored the state previously. PSS 100 also ensures the integrity of the stored state, and provides anti-replay protection. To protect the offline NVM for each DM, PSS 100 provides strong authentication and protection mechanisms that are rooted in TPM 30. This authentication identifies the PCS of the DM that saved the NVM previously, and ensures that the PCS has not been tampered with since the NVM was saved. In addition to authenticating the PCS that is loading the NVM, it is also critical that the TPM ensures that the TVMM, GVTPM manager 110, and any other code with the capability to undermine the component isolation have not been tampered with since the NVM was saved.

To do this, in the example embodiment, the hash of the GVTPM components will be stored in a PCR in TPM 30, as will the hash of all software in the underlying trusted computing base (TCB). In general, the term TCB refers collectively to the components of a processing system that can affect the fundamental security policies of the processing system. For instance, the TCB may include the hardware, the boot code, the kernel, the configuration files that control system operation, and any program that can run with the privilege or access rights to alter the kernel or the configuration files. In the example embodiment, TPM 30 will detect tampering of GVTPM components or the TCB, will prevent the release of secrets to an inappropriate DM, and will ensure that the proper memory protections are still in place.

2.3.1—Saving NVM

In the example embodiment, whenever an operation changes the NVM of a DM, the DM issues a request to PSS 100 to save its NVM. In alternative implementations, DMs can be designed to delay the saving of their NVMs, to increase performance at the possible cost of lower assurance.

When PSS 100 receives the NVM, the NVM arrives as opaque data. The NVM data is considered opaque because PSS 100 does not analyze the NVM data it receives. PSS 100 may simply generate a nonce and then encrypt the NVM data and the nonce. In the example embodiment, PSS 100 uses its own non-migratable TPM key to perform the encryption, and this key has its PCR binds set to the measurements of the platform TCB, GVTPM manager 110, and PSS 100. By using PCR bindings, TPM 30 will ensure that this blob can only be decrypted by the key when the TCB and GVTPM manager 110 are unmodified. PSS 100 may then give a copy of the encrypted NVM blob to the DM.

Once the NVM blob is saved, PSS 100 measures the DM, and PSS 100 records the measurement of the DM, the NVM blob identity, and the nonce, in a persistent database. The hash of the blob may serve as a good unique identifier. If this DM has a previously saved state, PSS 100 may overwrite the old record with the new record.

2.3.2—Restoring NVM

In the example embodiment, when a DM starts up, it requests that its previously stored NVM be restored by PSS 100. In response, PSS 100 first calculates the identifier for the blob, allowing PSS 100 to look up the record in the database. Next, PSS 100 measures the DM and verifies that the DM measurement matches that in the record. Then, PSS 100 uses its TPM key to decrypt the blob, and verifies the nonce inside.

In the example embodiment, before restoring the NVM, PSS 100 ensures five conditions:

NVM corresponds to the requesting DM.
NVM is the most recent NVM for that DM.
NVM is unmodified since storing.
NVM blob was created by PSS 100.
The TCB has not changed since the NVM was stored.

Comparing the DM measurements ensures meeting condition 1. The combination of a successful lookup and a successful decryption indicates that conditions 2 and 3 are also true. Inclusion of the secret nonce indicates that the PSS created this blob and it is not a forgery using the PSS public key, hence ensuring condition 4. Lastly, the successful use of the PSS TPM key to do the decryption indicates that the TPM has verified that the GVTPM framework and the TCB are both in the same state as they were before.

Once all five conditions are verified, the opaque NVM is returned to the DM, and the DM proceeds through its initialization.

2.4—Virtual Manufacturer Authority

In many cases, it is valuable to have evidence that a given key resides in a DM, which in turn resides in a given GVTPM environment. In the case of a hardware TPM, the TPM manufacturer signs the endorsement credential to state that the EK is protected inside the TPM, and the platform manufacturer signs the platform credential to state that the TPM resides in a TCG compliant platform. In GVTPM framework 40, each virtual manufacturer authority acts in a similar fashion, certifying that keys reside in a DM which complies with a particular device model within GVTPM framework 40 within a TCG compliant platform.

In effect, GVTPM framework 40 allows a trusted certificate authority to delegate TPM manufacturer and platform manufacturer status to a virtual manufacturer authority. In an example embodiment, the virtual manufacturer authority is a piece of measurable software on the platform acting as the TPM manufacturer, the platform manufacturer, or both. The virtual manufacturer authority allows platforms using virtualization to securely create new vTPMs with the appropriate credentials required for attestation.

Figure 5:
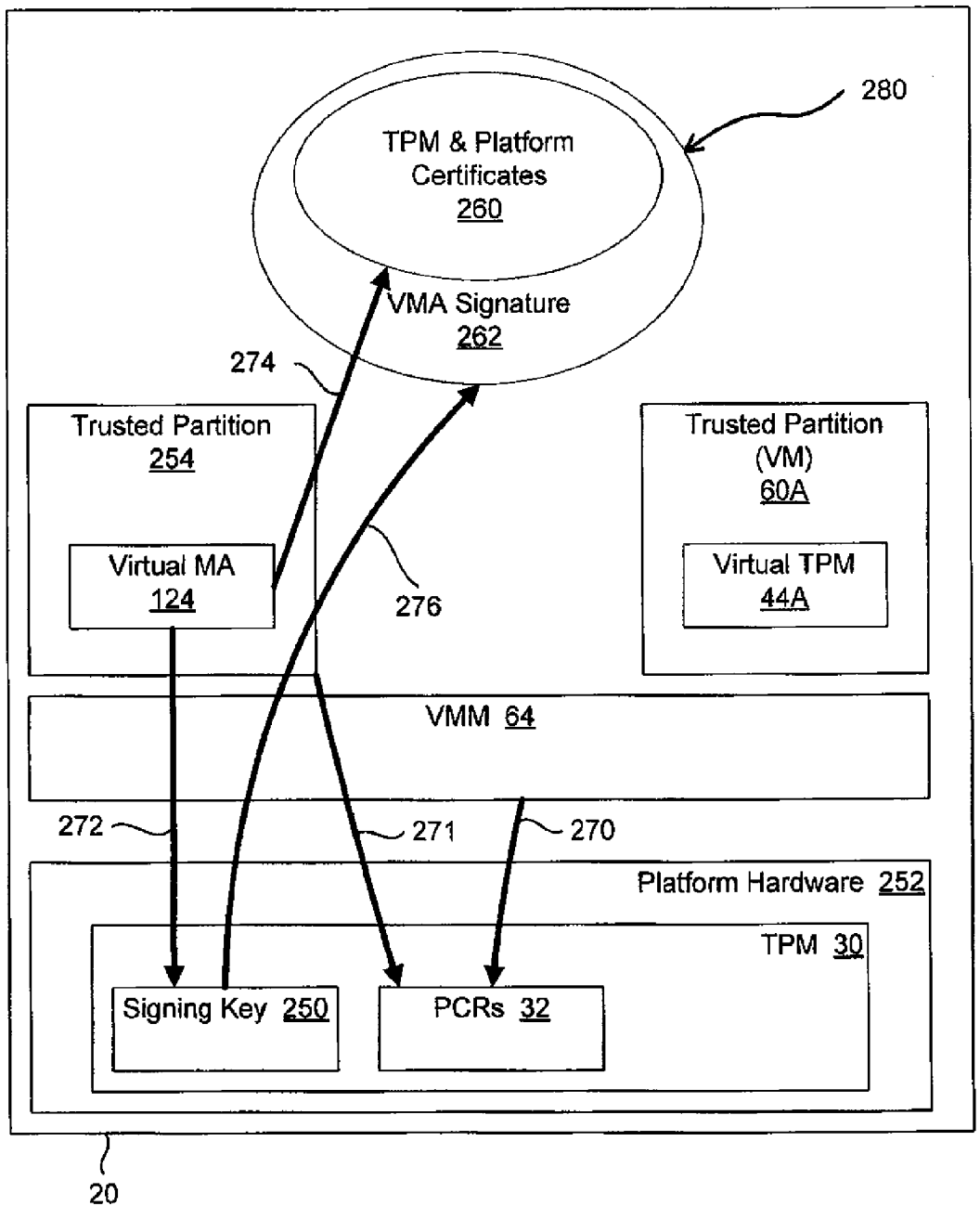
FIG. 5 is a block diagram illustrating example components and operations to prepare a virtual manufacturer authority to provide security attestation for a virtual TPM.

FIG. 5 is a block diagram illustrating example components and operations to prepare a virtual manufacturer authority to provide security attestation for a vTPM. In FIG. 5, the hardware of processing system 20 is depicted collectively as platform hardware 252. That hardware includes TPM 30. Running on top of the hardware are one or more trusted partitions. In one embodiment, those partitions include VM 60A and a vMA partition 254. VMM 64 may operate in third distinct partition. One or more of the partitions may be implemented as virtual machines, for instance. In alternative embodiments, one or more of the components can share a protected partition.

In the example embodiment, the virtual manufacturer authorities reside locally on processing system 20 within a trusted component. For example, virtual manufacturer authority 124 may reside within a trusted VMM 64 or in a trusted partition 254 (e.g., a trusted VM) supported by VMM 64. However, in alternative embodiments, virtual manufacturer authorities may reside in firmware or any other protect partition where they can be measured and that measurement can be stored in a platform's TPM. The vTPMs also reside locally on processing system 20 within a trusted component. For instance, vTPM 44A resides in VM 60A in the example embodiment.

Each virtual manufacturer authority creates a signing key 250 within TPM 30, to be used for signing TPM credentials. In the example embodiment, in order to make the certification from virtual manufacturer authority 124 meaningful, virtual manufacturer authority 124 first convinces a third party (e.g., an external CA) that the configuration of virtual manufacturer authority 124 is trustworthy and that the signing key of virtual manufacturer authority 124 is protected by a TPM. This third party may be considered a virtual manufacturer certifying authority (VMCA). In essence, the VMCA is an entity trusted by privacy CAs to determine which GVTPM environments are trustworthy enough to manufacture reliable virtual TPMs. The same entity can serve as the privacy CA and the VMCA, or, as depicted in FIG. 1, privacy CA 76 and VMCA 77 may be separate entities, with privacy CA 76 trusting VMCA 77 to accurately assess vSC frameworks and DMs.

In the example embodiment, when processing system 20 launches VMM 64, and when VMM 64 creates partition 254 and loads virtual manufacturer authority 24 into that partition, the values in PCRs 32 are modified to reflect the evolution of the platform, as indicated by arrows 270 and 271.

As indicated by arrow 272, virtual manufacturer authority 124 then creates a TPM signing key 250 that is bound to the state of virtual manufacturer authority 124 as well as any software that affects the integrity of the virtual manufacturer authority 124, such as GVTPM framework 40, VMM 64, and any other components in the TCB, as reflected in PCRs 32. Virtual manufacturer authority 124 then proves to VMCA 77 that TPM 30 will not allow any entity other than virtual manufacturer authority 124 to access to that TPM signing key.

The bindings to the state of the virtual manufacturer authority and the TCB prove that virtual manufacturer authority 124 will operate in accordance with the policies embodied in GVTPM framework 40. Virtual manufacturer authority 124 thus proves that it is controlled by a specified platform and software configuration. Signing key 250 therefore implicitly verifies that any virtual TPMs created by GVTPM framework 40 will operate in accordance with the policies embodied in GVTPM framework 40. VMCA 77 can then decide whether that environment is trustworthy, for instance by reference to a list of approved environments.

For instance, virtual manufacturer authority 124 in FIG. 3 may use a protocol to prove to VMCA 77 that the signing key 250 for virtual manufacturer authority 124 resides in TPM 30 and is only available to virtual manufacturer authority 124 when processing system 20 is in the same configuration as when the signing key was created. One example of such a protocol is for virtual manufacturer authority 124 to create an AIK within the TPM 30. Through standard channels, virtual manufacturer authority 124 then acquires an identity credential for this key, which is signed by a privacy CA and is proof that any claims made by the identity key are made by a trusted TPM. This identity key is then used to certify signing key 250, which is a process by which TPM 30 uses the identity key to sign a statement that the signing key is located in the same TPM as the identity key, and the signing key is bound to the specified configuration that ensures trust for the environment supporting virtual manufacturer authority 124. When this statement is combined with the identity credential, which says that identity is in a real TPM, it is derived that the signing key 250 of virtual manufacturer authority 124 is protected by a legitimate TPM and only available for use in the specified configuration that provides trust for the operations of virtual manufacturer authority 124.

Once virtual manufacturer authority 124 convinces VMCA 77 that virtual manufacturer authority 124 has a TPM signing key bound to a particular configuration, VMCA 77 makes an informed decision on whether that configuration is safe enough to be trusted. If this configuration is deemed sufficiently trustworthy, VMCA 77 creates a certificate with the public portion of the signing key which states that VMCA 77 has delegated power to sign endorsement credentials and platform credentials to the virtual manufacturer authority's signing key. This certificate is pushed through the network of other CAs that trust the decisions of VMCA 77.

The validity period on the credential of a virtual manufacturer authority and on credentials signed by the virtual manufacturer authority will likely be proportional to how extensive was the review of the GVTPM framework and its TCB. The discovery of a vulnerability in the GVTPM framework or the underlying TCB should result in removal of trust in the GVTPM DMs. Under such circumstances, VMCA 77 would wish to revoke the delegation to the virtual manufacturer authority, and would typically inform the network of other CAs that VMCA 77 no longer trusts that virtual manufacturer authority. For instance, after delegating authority to virtual manufacturer authority 124, if VMCA 77 subsequently determines that the configuration of virtual manufacturer authority 124 and/or its vTPM architecture are vulnerable, VMCA 77 can revoke this delegation.

After VMCA 77 accepts the proof from virtual manufacturer authority 124, virtual manufacturer authority 124 may use signing key 250 to attest to the trustworthiness of virtual TPMs such as vTPM 44A. Specifically, in the example embodiment, virtual manufacturer authority 124 generates new endorsement and platform credentials 260 based on information about vTPM 44A, as indicated by arrow 274, and virtual manufacturer authority 124 uses signing key 250 from TPM 30 to sign those credentials without further interaction with VMCA 77. That new signature 262 is therefore appended to certificates 260 to create the finished certificate 280, as indicated by arrow 276. Certificates such as finished certificate 280 that have been signed by a virtual manufacturer authority may be referred to as vMA certificates or vMA credentials.

Virtual TPM 44A may then use vMA credentials 280 in the same manner as if they were credentials for a hardware TPM signed by a TPM manufacturer and a platform manufacturer. Processing system 20 can therefore create virtual security coprocessors such as vTPM 44A in real time (i.e., without the delay associated with obtaining credentials from an external processing system), while still providing high security assurance.

As indicated above, in the example embodiment, at least each type of DM has its own virtual manufacturer authority. For example, a particular GVTPM framework may include one virtual manufacturer authority for all TPM DMs, and different virtual manufacturer authorities for each proprietary DM design. Accordingly, virtual manufacturer authority 124 may service vTPMs 44A and 44B, for instance. In the example embodiment, when processing system 20 creates a new vTPM, such as vTPM 44A, GVTPM manager 110 provides virtual manufacturer authority 124 with the endorsement key for the new vTPM, along with any other information necessary for virtual manufacturer authority 124 to create an endorsement credential and platform credential that properly identify the software extension to TPM 30 and the software platform which the vTPM architecture resides in. Virtual manufacturer authority 124 is then responsible for signing those endorsement and platform credentials, using signing keys endorsed by a trusted CA.

The paragraphs above describe an example embodiment in which a virtual manufacturer authority uses signing keys and identity keys from a TPM to attest to the virtual manufacturer authority's configuration. Other types of security subsystems, such as proprietary security coprocessors, and other types of keys may be used in alternative embodiments. Similarly, other approaches may be used to verify that the configuration for the virtual manufacturer authority is acceptable to an external CA serving, in effect, as a VMCA. For example, the external CA may seal a secret to a key in such a manner that the secret can be unsealed by a virtual manufacturer authority only if the virtual manufacturer authority has a predetermined configuration. After the external CA transmits the secret to the virtual manufacturer authority, if the configuration of the virtual manufacturer authority matches the predetermined configuration, the virtual manufacturer authority will be able to unseal the secret. The virtual manufacturer authority may then send proof to the external CA that the virtual manufacturer authority was able to unseal the secret. In response, the external CA may delegate the requested authority to the virtual manufacturer authority. The virtual manufacturer authority may then use the delegated authority to sign credentials for the vTPM.

The following paragraphs describe example protocols that may be used by a virtual manufacturer authority to obtain acknowledgement from a VMCA, as well as example methods for creating such credentials. Acknowledgement from the VMCA may provide the virtual manufacturer authority with the credentials needed to sign TPM and non-TPM credentials.

2.5—vTPM Credentials

As indicated above, each virtual manufacturer authority may first create a TPM identity key (AIK) and acquire an identity credential from a trusted third-party CA (TTPCA) using the process outlined in the TCG specification. The TTPCA may be a TCG privacy CA, for instance. The virtual manufacturer authority then creates its signing key, bound to the current platform configuration. For example, virtual manufacturer authority 124 may use the TPM_CertifyKey operation to have TPM 30 use the virtual manufacturer authority's AIK to sign the properties of the signing key, including its migration abilities and the PCRs to which it is bound. Virtual manufacturer authority 124 may then send the CertifyKey results along with the identity credential to VMCA 77.

Generally, VMCA 77 should trust the identity credential, which was signed by a TCG privacy CA. The credential indicates that the identity key resides in a valid TPM, and the CertifyKey certificate indicates that the signing key will only be available to that specific virtual manufacturer authority and TCB.

Once VMCA 77 is convinced that virtual manufacturer authority 124 is trustworthy, VMCA 77 will delegate TPM manufacturer status to virtual manufacturer authority 124. For instance, VMCA 77 may create a delegation certificate and distribute that certificate to TCG privacy CAs.

Virtual manufacturer authority 124 may then use the delegated TPM manufacturer status to create an endorsement credential and a platform credential for a DM (e.g., vTPM 44A). The model fields in these credentials may indicate both the hardware and software platform on which vTPM 44A resides. In one embodiment, for the endorsement credential, the model field would indicate the hardware TPM model and the GVTPM manager 110. For the platform credential, the model field would indicate the hardware platform and the TCB, which includes VMM 64 and similar software.

2.6—Non-vTPM Credentials

A proprietary DM (e.g., DM 44C) that does not adhere to TCG specifications should not have an endorsement or platform credential; though, it can still benefit from similar credentials. The developer of a proprietary DM might operate its own evaluator service, similar to a privacy CA, for the express purpose of issuing credentials, so that the developer can guarantee a key is in an instance of the developer's DM before data is encrypted to that key. The precise protocol for doing so is completely up to the entity that designed the proprietary DM and the virtual manufacturer authority that corresponds to that DM.

3.0—Example vTPM Device Model Designs

This section describes two example DM designs for creating vTPMs. For GVTPM framework 40, these correspond roughly to opposite ends of the spectrum from strict security to greater performance and flexibility. The first model, referred to as the software-based DM, recognizes that once the vTPM is anchored in TPM hardware, software can provide complete TPM functionality to the OS in a VM. All private keys are stored in the device model's memory, as is all other data stored in the virtual TPM. In the second model, referred to as the hardware-based DM, all keys are stored in the hardware TPM. In the second model, when a key is used, the device model issues a request to the TPM to use the key. In the first model, the vTPM is not hindered by the performance limitations of the TPM, while the second still relies on the hardware TPM to service most requests. The security difference between the first model and the second model during normal functioning is identical. However, the resulting state of the system and its secrets after a compromise has occurred is different between the models.

If the DM or the VMM of the platform is compromised, all data stored in the DM's memory may be compromised. During the compromise, both models may allow the attacker to use keys in that vTPM. Once the vulnerability is patched and the compromise is ended, access to those keys is terminated in the hardware-based DM. However, in the case of the software-based DM, the private keys may have been permanently compromised since they were available in memory.

In most environments, the software-based approach can achieve an adequate level of security. However, in environments in which it is more expensive to revoke and regenerate compromised keys, the hardware-based approach may be appropriate, since compromises would be temporary. These types of environments might include a server where high performance, highly tamper-resistant TPMs are used to protect important corporate keys. The proposed framework leaves these choices to the implementers, who can decide on the preferred approach for meeting the assurance needs of a particular implementation. For example, a hybrid approach that uses the TPM to house some keys and/or data structures may be appropriate for certain implementations.

3.1—Software-Based vTPM Device Model

A completely software-based vTPM DM uses few or no hardware TPM resources for providing TPM functionality. Once the PSS and the hardware TPM have guaranteed that the DM and the TCB are the same as those reflected in the credentials of the DM, the DM is left to function independently of the hardware TPM. All virtual PCRs, monotonic counters, non-volatile storage, and other TPM resources are stored and managed in the memory of the DM.

The benefit of this design is that the functionality exposed by the device model is not hampered in any way by the functionality or performance provided by the hardware TPM. Stronger keys, larger numbers of key slots and more PCRs are all easily supported. In addition, typical hardware TPMs are very resource constrained and are not very high performance devices. However, the performance of a software-based DM is not bound by that of the hardware TPM. For example, a software-based DM can support bulk encryption, whereas bulk encryption with a conventional hardware TPM is extremely slow.

3.2—Hardware-Based vTPM Device Model

The second example vTPM device model attempts to maximize the use of the protected processing within the hardware TPM. The main use of the hardware TPM resources is that all keys for each DM are stored in the hardware TPM, and private keys are never stored in main memory.

3.2.1—Key Hierarchy

This section describes the overall key hierarchy utilized in an example embodiment of a hardware-based device model. This example embodiment is described in the context of DM 44A serving as a vTPM for VM 60A, as illustrated in FIG. 3.

Referring again to FIG. 2, TPM 30, as usual, maintains a standard endorsement key (hwEK) 52 and a storage root key (hwSRK) 50. Additionally, an AIK known as a key binding key (KBK) 160 is used to protect vTPM keys.

Also, each DM may have appropriate keys and data structures to emulate a hardware TPM for each respective VM. For instance, in the example embodiment, DM 44A has a virtual EK (vEK) 150 and a virtual SRK (vSRK) 152 whose parent key is hwSRK 50. Parented in the vSRK, there are virtual signing keys (vSigKs) 154, virtual storage/encryption keys (vEncKs) 156, and virtual identity keys (vAIKs) 158. Additional structures in each DM for emulating a hardware TPM may include virtual PCRs (vPCRs) 92 and virtual DIRs (vDIRs) 94. Each DM may also contain data such as a virtual EK credential (vEK_Cred) 96 and one or more virtual AIK credentials (vAIK_Cred) 98.

As indicated by the legend in the lower right corner of FIG. 2, storage keys are illustrated as ovals with no fill, attestation identity keys (AIKs) are illustrated as ovals filled with horizontal lines, and signing keys are illustrated as ovals filled with a pattern of dots. In addition, bolded ovals represent keys that are bound to PCRs 32 of TPM 30. Lines between keys indicate parent/child relationships among the keys. For example, those lines indicate that SRK 50 is a parent key for certain virtual keys within each DM. Credentials are represented by parallelograms.

In one embodiment, the virtual keys and other structures or objects within a vTPM may have the same structure as hardware TPM keys or objects, but the virtual objects within a virtual TPM are not mere references to the standard objects within TPM 30, such as EK 52, SRK 50, and PCRs 32. Instead, as described in greater detail below, each virtual TPM gets its own distinct objects, such as vEK 150, etc. Those virtual objects may be based on or derived from the objects of the hardware TPM. For example, in the example embodiment, the virtual SRKs and virtual EKs are children of the hardware SRK or, in the case of nested vTPMs, a virtual SRK ultimately based on the hardware SRK. By allowing for vTPM keys to be rooted in vSRKs, this model allows for vTPM nesting.

Virtual TPM objects such as vEK 150, vSRK 152, and vPCRs 92 may in turn serve as the basis for additional virtual objects within DM 44A, such as vSigKs 154, virtual AIKs (vAIKs) 158, and virtual storage/encryption keys (vEncKs) 156. In the example embodiment, each DM may provide all of the functions provided by a corresponding hardware device, with the same application program interfaces (APIs). For example, DM 44A may include its own vDIRs 94, vPCRs 92, vAIKs 158, etc. Consequently, the guest OS in each VM may be completely unaware that the corresponding vTPM is not a hwTPM. The VMs may therefore use legacy OS code. In addition, according to the example embodiment, a processing system with a conventional hwTPM may be configured to provide vTPMs without requiring any modifications to the hwTPM.

The virtual machine architecture may leverage the hardware TPM to protect the virtual keys and related data. In one embodiment, the vTPM key hierarchies and related data are protected within a standard hwTPM. For example, the virtual TPM keys may be stored in, and never released from, the hardware TPM, unless the data is first encrypted. Consequently, if a virtual TPM is compromised, the public portions of the associated vTPM keys may possibly be subject to unauthorized use, but only for the duration of the compromise. In the example hardware-based embodiment, all keys will remain inside the hardware TPM, and the private keys therefore cannot be stolen or used once the compromise has ended.

A processing system according to the present invention may also provide an attestation protocol architecture that allows vTPMs to provide conventional TPM attestation services. Remote challengers with no awareness of virtual TPMs may participate fully in the attestation process. Moreover, remote challengers with vTPM awareness may be capable, without additional protocols, of distinguishing hwTPMs from vTPMs, and may then decide whether or not to trust a platform hosting a vTPM. Remote challengers may include, without limitation, entities that provide data only to verifiably safe clients. Such a challenger may be referred to as a third party data provider.

As indicated above, in the example hardware-based model, all keys for each DM are stored in TPM 30. Depending on the capabilities of TPM 30 and the particular security requirements of a particular implementation, one or more of other structures and data items, such as credentials 96 and 98, vPCRs 92, vDIRs 94, etc., may also be stored in the hardware TPM, or they may be stored in PSS 100 of GVTPM framework 40.

When a privacy CA creates an identity credential for a platform, the privacy CA encrypts the identity credential to the platform's EK before transmitting the identity credential to the platform. In one embodiment, VM 60A operates as a platform interacting with privacy CA 76, and VM 60A uses a hardware-based vTPM device model (e.g., DM 44A). Accordingly, privacy CA 76 will encrypt the identity credential (e.g., vAIK_Cred 98) to the VM's vEK 150. This encryption protects the credential in transit. When VM 60A receives the identity credential from the privacy CA, VM 60A uses the vEK's private key from DM 44A to decrypt this credential. Since vAIK_Cred 98 is not in a TCG bound data structure, vEK 150 must be a TPM legacy key in order to support decrypting this credential.

In the example embodiment, vSRK 152 and vEncKs 156 are traditional TPM storage keys and require no special attention. Similarly, the vSigKs 154 are traditional TPM signing keys and require no special attention. Identity keys, however, are only able to sign quoted PCR values. This means the vAIK, if implemented as an AIK, would be unable to sign virtual PCRs stored in DM memory, since they are data that is external to hwTPM 30. Therefore, vAIKs 158 may be implemented as TPM signing keys. Quote structures may be constructed for virtual PCRs 92 in DM 44A and then signed with a vAIK. Lastly, KBK 160 is a traditional binding key.

3.2.2—Enforcing Virtual PCRs on TPM Keys

The hardware TPM (e.g., TPM 30) and the VM using the vTPM (e.g., VM 60A using DM 44A) have different notions of what the current PCR values are. Care must be taken to ensure that information flow between the vTPM and the TPM remains consistent. When a VM requests that a key be created in the vTPM, that request is accompanied by vPCR bindings, though the guest may not realize that the binding are virtual. When this request is forwarded to the hardware TPM, the PCR field in the request must be translated into correct hwPCR bindings. DM's may use the GVTPM+TCB as bindings or omit them for performance. The resulting newly created wrapped key returned from the hardware TPM will thus not contain the vPCR bindings requested by the VM. Since the wrapped key does not contain those bindings, it may be possible for an attacker to bypass the vTPM, if attacker were to obtain the original wrapped key and load it directly into the hardware TPM.

Additionally, the wrapped key returned by a hardware TPM is a TCG_KEY structure containing the TPM version, PCR bindings, public key, encrypted private key, and other information that is returned to the requestor. The version and PCR binding information is that of the hardware TPM, not the vTPM. In order to preserve transparency, the TPM_KEY structure returned by the vTPM should have the vPCR bindings and the vTPM version information. In one embodiment, to address this issue, the wrapped key returned by the vTPM will be a modified form of the wrapped key returned by the hardware TPM. For purposes of this disclosure, the wrapped key returned by the vTPM may be referred to as a vTPM double wrapped key.

Figure 4:
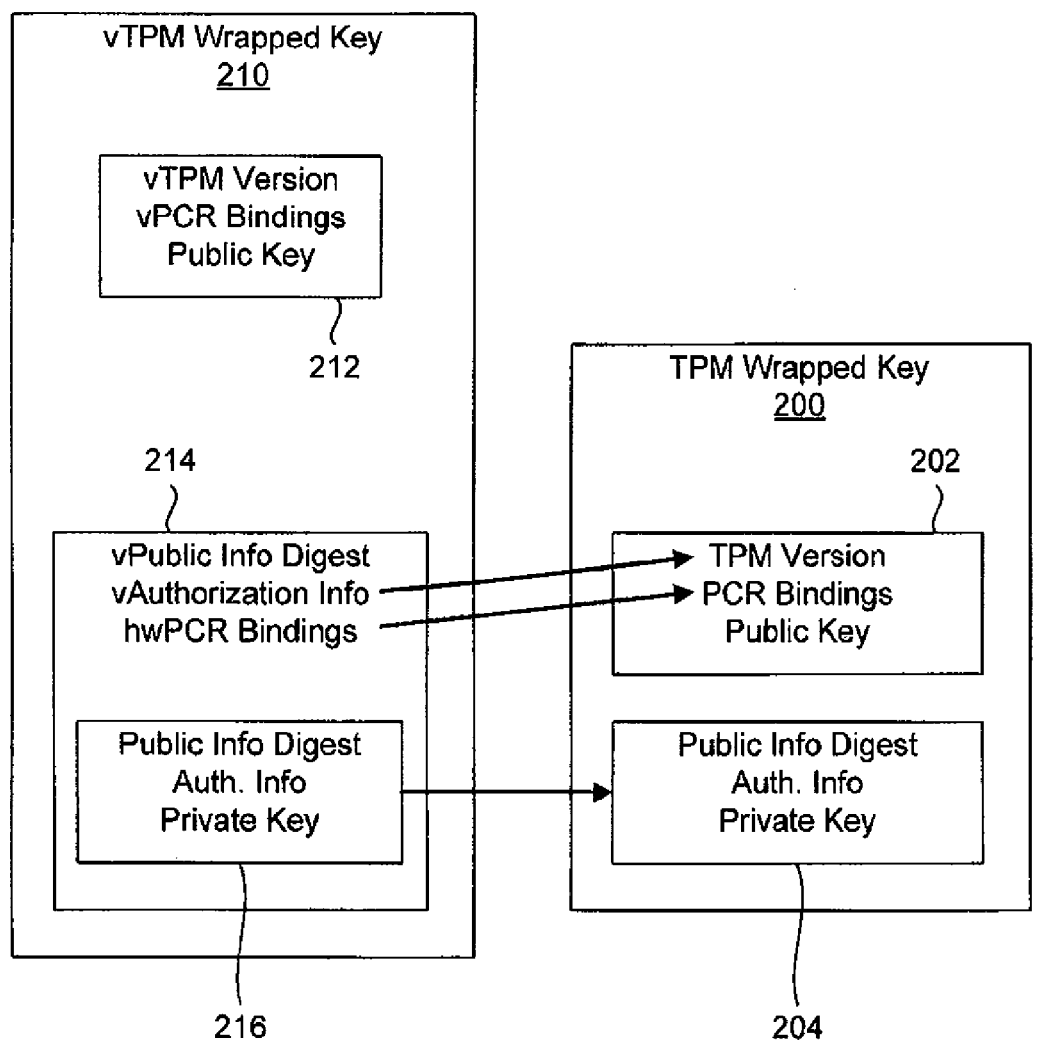
FIG. 4 presents a block diagram of an example embodiment of a virtual TPM double wrapped key.

FIG. 4 presents a block diagram of an example embodiment of a vTPM double wrapped key. In FIG. 4, vTPM wrapped key 210 is a modified form of the wrapped key 200 returned by TPM 30. In one embodiment, the operations below may be performed whenever VM 60A requests that a new key be created by vTPM 44A, such as when DM 44A in VM 60A creates a new vAIK, and processing system 20 proceeds to store that key in TPM 30.

In vTPM wrapped key 210, all public portions of the structure remain intact to ensure transparency. Also, as illustrated at block 214, the encrypted private key section 216 of the TCG_KEY structure will be expanded to include the hwPCR bindings, authorization to use this key, the hardware TPM's version, a digest of the public portions of the key, and the original encrypted private key section, which is unreadable to the vTPM device model (e.g., DM 44A). As indicated at block 212, the PCR bindings in the public portion of the TCG_KEY structure will be replaced with the vPCR bindings, and the version will be set to that of the vTPM. The digest stored in the private portion will reflect these modifications. Lastly, the expanded private key section 216 will be encrypted with KBK 160 (described above). The result is a TCG_KEY 210 with the expected version and vPCR bindings, and an unreadable encrypted section, which, if passed to the hardware TPM, will not decrypt properly.

For use, the key returned to the user must be loaded into the virtual TPM (e.g., DM 44A), which will decrypt the private key section 216, verify the virtual PCR binding 212, and reconstruct the original wrapped key 200. Once the vPCR and authorization are verified, the DM loads the original wrapped key 200 into the TPM, including a copy 204 of private key section 216. The original wrapped key 200 will similarly be decrypted by the hardware TPM and the hardware PCR binding 202 will be verified before the key 200 is fully loaded and available for use.

3.2.3—Other Device Model Resources

The virtual TPM device model may be unable to share most of the other TPM resources across many DMs. Monotonic counters typically cannot be shared without modifying applications to expect non-exclusive counter usage, and therefore may either be permanently allocated to a specific DM or be implemented in software similar to that of the software-based device model. The vTPM non-volatile storage can be stored in the hardware TPM, as long as it does not exceed the storage of the hardware TPM. If the hardware TPM's storage is inadequate, non-volatile storage can also be virtualized similarly to that of the software-based DM.

The VM must be able to create authorization sessions to use many of the TPM functions; however, it typically should not differentiate between functions handled by the vTPM device model directly and those passed on to the hardware TPM. In one embodiment, the DM transparently provides TPM functionality, from both itself and the hardware TPM, under a single user authorization session.

To accomplish this, the DM maintains separate authorization sessions with both the VM and the hardware TPM. That is, the user will create an authorization session with the DM as normal. The DM may do all the same authorization checks based on this session that a hardware TPM would do. If the DM provides the requested function directly, the DM may simply update the session nonces and reply. If the DM needs the hardware TPM to provide the service, the DM may create or reuse an existing authorization session it has with the hardware TPM and make the request. Once the DM is done using the hardware TPM, it may update the nonces on the user's session and reply.

4.0—Hardware Optimizations

The framework discussed above may provide TPM capabilities to multiple guests using a single conventional TPM. The framework may use either software or the hardware TPM to provide the TPM functionality; however, using the TPM to enforce virtual PCRs may be cumbersome. This section describes TPM features to optimize and simplify the hardware-based device model. Those features include the following: [0134] Virtual PCRs [0135] Virtual Attestation Identity Keys [0136] Virtual EK A typical conventional TPM may be unable to store vPCRs, to allow the TPM to enforce key bindings and provide vPCR quotes. This leads to the need for double wrapped keys, with the DM enforcing and managing vPCRs. A modified TPM that is capable of storing vPCRs removes a great deal of complexity and provides increased performance. U.S. patent application Ser. No. 11/095,034, assigned to the same assignee as the present application, discusses technology to supporting PCRs and/or vPCRs for virtual machines.

Once vPCRs are available in the modified TPM, AIKs should be able to quote them. In one embodiment, the modified TPM has the ability to create virtual AIKs (vAIKs) which quote the vPCRs rather than the main PCRs.

Lastly, in order to effectively quote PCRs, a vAIK requires an identity credential. As noted earlier, identity credentials are encrypted to the EK. In one embodiment, the modified TPM includes support for vEKs that can decrypt the credentials for the vAIK.

With these modifications, the performance of the hardware-based DM within GVTPM framework 40 may be increased, while simultaneously reducing the framework's complexity and therefore increasing its trustworthiness.

5.0—Remote Deployment and Provisioning of Virtual TPMs

The use of TPMs on platforms may create new challenges for software and data distribution. For example, an information technology (IT) department within an organization may create a software build or patch, and then push the build or patch to hundreds or thousands of machines across the organization. TPMs add a new dynamic to this process, due to the way TPMs are used to protect keys and seal data. To distribute a new software package to a machine, the IT department may find that any keys which are needed by that software need to be distributed to the machine's TPM.

The following paragraphs describe how vTPMs can be provisioned on one machine (e.g., a server), and then distributed to other machines (e.g., clients) with the software that is expected to make use of the vTPMs. An example usage model for the approach described below is in a business enterprise; however, that approach or variations thereof can be used in any environment where the consumer of the services of the vTPM has a sufficiently close relationship with the entity providing the services, such as when the client system runs software from a particular entity, and the client system uses that software to access data provided by the same entity. For example, a client system in a physician's office could obtain, from an insurance company, a vTPM along with a content viewer to use that vTPM. The client system could then use that content viewer to access protected insurance records from the insurance company. In an example embodiment, the only entity that needs to trust the vTPM is the insurance company, which is the same entity that provided the vTPM.

A remotely provisioned vTPM, unlike a normal vTPM, is created externally to the platform in which it will operate. This means that the virtual manufacturer authority will no longer sign both the endorsement credential and the platform credential for the vTPM. In an example provisioning environment, an IT department manufactures the vTPM, generates the endorsement key for that vTPM, signs the endorsement credential, and then sends the vTPM and endorsement credential to a destination machine. Once the vTPM is inserted into the destination machine, the virtual manufacturer authority will create a platform credential for the new vTPM and sign it. The signatures on these two credentials identify two entities a challenger must trust. The IT department had access to the private endorsement key as well as any other keys that it preloaded into the vTPM, so the IT department signs the endorsement credential. The vTPM architecture components (e.g., GVTPM framework 40) and the platform's isolation mechanism integrate the vTPM into the software platform. They potentially have access to the secrets stored in the vTPM. Therefore, these entities must also be trusted by the challenger. Consequently, the platform credential is signed by the virtual manufacturer authority.

If a challenger does not trust the entity that signs the endorsement credential and the entity that signs the platform credential, the challenger may reject attestations from this vTPM. In the case of an enterprise, the IT department will likely control the manufacturing of the vTPM, the vTPM platform, and the challenger software. Thus, there is an inherent trust among these entities. Similarly, a content provider may control manufacturing of vTPMs and related challenger software. Therefore, such a content provider may only need to trust the vTPM platform.

On example mechanism for deployment is to transfer the vTPM to the PSS of the destination. How this is accomplished is dependent on the implementation of the PSS and the GVTPM manager. In an example implementation, the PSS maintains a storage key which it can prove to external entities is protected by a hardware TPM and bound to the specific vTPM architecture. While this key is used to store state, it can also be used to receive state. The following steps exemplify how this transmission may occur.

1) The provisioner generates the new vTPM and all keys needed within the vTPM. Also, the provisioner generates and signs the new endorsement credential for that vTPM.
2) The provisioner requests that the destination PSS provide an anti-replay nonce.
3) PSS sends the provisioner a nonce and optionally the public key of the PSS. This key may already be known from a prior communication.
4) The provisioner then encrypts the state of the new vTPM and the nonce from step 3 to the storage key of the PSS.
5) The provisioner sends the encrypted blob to the PSS, along with the endorsement credential for that vTPM.

6) The PSS receives the vTPM state, decrypts it, seals it like it does all offline vTPMs, and records it as a known vTPM. This vTPM is now officially part of the PSS's platform.
7) A virtual manufacturer authority for the PSS creates a platform credential for the vTPM. The PSS may now load and use the vTPM like it would any other.

When software requiring TPM keys is to be distributed to a client, if the vTPM were to be created on the client system instead of being created on a server and then transferred to the client, the server would typically need to instruct the client to create a vTPM, and then wait while the client generates each key required by the software. The client could then send the public key portions of the generated keys to the server, and the server would then use those public keys to generate the application and data to deploy. If hundreds or thousands of clients are to be updated, this process could take a long time to complete. Moreover, the server does not have control of the environment generating the keys.

When the entity that creates keys will also be the challenger (i.e., the entity that will be requesting attestation or otherwise relying on the keys), the approach introduced by this disclosure may provide a faster and more efficient method for creating the necessary keys and vTPMs to support those keys.

As reflected in FIG. 2, like TPMs, vTPMs includes structures for storing data that constitutes the state of the vTPM. For instance, some of the state for a vTPM is stored in PCRs and DIRs. In addition, the state of a vTPM may include various keys, credentials, counters, etc. For purposes of this disclosure, generating a significant portion of the state data for a vTPM may be considered creating a vTPM.

In particular, for purposes of this disclosure, the generation of an EK constitutes the creation of a vTPM. As described above, once a vTPM has been created, it may be transferred to a target system. The rest of the state for that vTPM may be generated when a platform, VMM, or VM takes ownership of the vTPM. The process of creating a vTPM and transferring it to another processing system may be referred to in general as remote provisioning and deployment of the vTPM.

6.0—Migrating Virtual TPMs

In some environments, the fixed nature of the TPM is important. Some environments, however, could benefit from controlled mobility of the TPM across platforms. The TCG has approved a mechanism by which a single key can, with third party intervention, be migrated from one TPM to another. This mechanism can be cumbersome, however, particularly when more than one key needs to be migrated. The paragraphs below introduce a new way to migrate vTPMs from platform to platform in a controlled manner. In the example embodiment, all keys are migrated at once, without requiring third party intervention for each key being migrated.

The method of migration described below provides important assurances. For instance, if a vTPM is advertised to have specific security properties, when a key is created in the vTPM, all stakeholders for that key must be assured that, if that vTPM is migrated to another platform, those security properties will also be present in the new platform. Also, when a vTPM is migrated, the VTPM state must be moved, not copied, from the source platform to the destination platform.

A migration policy is used to support guarantees of advertised security properties. This policy determines what criteria a vTPM architecture and the platform mechanism protecting this architecture must meet in order for a particular vTPM to be migrated to that platform. Additionally, this policy is strictly enforced. In an example embodiment, a virtual manufacturer authority serves the purpose of enforcing the migration policy, and the virtual manufacturer authority maintains one key per migration policy (e.g., a signing key). When the virtual manufacturer authority registers with the trusted CA in order to gain manufacturer status, the virtual manufacturer authority also sends data to identify the migration policy that will be enforced by the virtual manufacturer authority for any vTPM with credentials that the virtual manufacturer authority signs with this signing key.

In an example embodiment, to support the creation of migratable vTPMs, in addition to the vTPM management functions that GVTPM manager 110 is normally required to handle, GVTPM manager 110 will declare vTPMs as either migratable or non-migratable during VTPM creation. Migratable vTPMs may require further specification to indicate which available migration policy will be used. For example, when the virtual manufacturer authority creates an endorsement credential and a platform credential, the virtual manufacturer authority may use a model number indicating the vTPM is migratable, and may sign the credentials with its migratable vTPM manufacturer key. That is, the virtual manufacturer authority may sign the credentials with a signing key recognized as belonging to a manufacturer of migratable vTPMs.

Thus, in one embodiment, migratable vTPMs get their endorsement credentials signed by one signing key, while non-migratable vTPMs get their endorsement credentials signed by a different signing key. This methodology allows better identification of migratable vTPMs. In some embodiments, one virtual manufacturer authority signs credentials for migratable vTPMs, and a different virtual manufacturer authority signs credentials for non-migratable vTPMs.

An example mechanism for migration is that the PSS on a source platform transfers the state of a migratable vTPM to the PSS in a destination platform. How this transfer is accomplished is dependent on the implementation of the PSS and the GVTPM manager.

In an example implementation, the PSS maintains a storage key which the PSS can prove to external entities is protected by a hardware TPM and bound to the specific vTPM architecture. While this key is used to store state, it can also be used to receive state. If the PSS in a first platform (PSS 1) wants to migrate a vTPM to a PSS in a second platform (PSS 2), the following steps may transpire.

1. PSS 1 requests that PSS 2 transmit its storage public key and proof of the bindings of this key.
2. PSS 2 sends its storage public key and a nonce to PSS 1.
3. PSS 1 evaluates the policy for the vTPM on PSS 2's state. PSS 1 should only migrate the vTPM if the policy declares PSS 2's state to be trustworthy to provide safe operation of the vTPM and to continue to uphold this policy for the next migration.
4. If PSS 2 passes, PSS 1 ensures that the vTPM is not running PSS 1 then encrypts the following to PSS 2's storage key: the persistent state of the vTPM, the nonce from step 2, and the measurement of the correct vTPM in which this state should run.
5. PSS 1 deletes the record for this vTPM from the list of known vTPMs. This ensures that this state cannot be reloaded into this service, and that when the migration is over, this vTPM will only exist under PSS 2.
6. PSS 1 sends PSS 2 the encrypted blob, along with the endorsement credential for the vTPM.

7. PSS 2 receives the vTPM state, decrypts it, seals it like it does all offline vTPMs, and records it as a known vTPM. This vTPM is now officially part of PSS 2's platform.
8. (optional) PSS 2's virtual manufacturer authority creates a platform credential for the vTPM. It is inaccurate for the vTPM to continue using PSS 1's platform credential, since the vTPM no longer resides on that platform. However, since the trustworthiness of the vTPM is only that of the weakest configuration that will pass the policy, it is not critical for security that this new credential be used. PSS 2 may now load and use the vTPM like it would any other.

The safety of the migration protocol may be validated to prove that it ensures the following: for a given migratable vTPM, the vTPM has never been compromised during its movement. By an inductive proof methodology, this assurance may be established if two following propositions can be proven to a challenger:
1. The vTPM state was originally created in a safe vTPM.
2. If the vTPM is in a safe vTPM, the vTPM architecture will only migrate the vTPM state to another safe vTPM.

The assurance of these two statements is found in the signatures on the credentials. When the vTPM was created, its endorsement credential was created and signed by a virtual manufacturer authority. Prior to this, the virtual manufacturer authority created its signing key and exchanged it, along with the migration policy, with a certificate authority. This CA will not sign an endorsement credentials for a virtual manufacturer authority unless the CA recognizes the virtual manufacturer authority as providing safe vTPMs and enforcing a safe migration policy. A virtual manufacturer authority with credentials signed by the CA therefore will never migrate a vTPM to a vTPM that is not safe.

Typically, a challenger receives a set of PCRs signed by an AIK, and an accompanying identity credential signed by a privacy CA. The challenger may base its assessment of the vTPM on this information. By seeing this credential, the challenger may safely conclude that the vTPM showed the privacy CA an endorsement credential signed by a trustworthy signing key. The privacy CA only trusts signatures that itself or another CA has vouched for. The only way the signature on the endorsement credential will have been vouched for by another CA is if the signing key was in a safe virtual manufacturer authority and the signing key corresponds to a migration policy which only allows for migration to other vTPMs that are safe. Therefore, the existence of the identity credential should convince the challenger that this vTPM was created in a legitimate vTPM, and that it has never resided in a rogue vTPM before giving this attestation.

Similarly, the above migration approach may be initiated from the platform to receive the vTPM, rather than the platform to provide the vTPM.

The disclosed migration methodology may be useful for a wide range of applications, including usage models in which individuals desire to access data from multiple machines. For example, a physician could conveniently migrate vTPMs between a home computer and an office computer, to allow the physician to access protected medical records from more than one location. The types of protected data that could be accessed include, without limitation, content protected by digital right management (DRM) protocols, proprietary content from the same entity that provides the software for accessing the content, and personal, sensitive, and/or confidential information (e.g., medical records, financial data, etc.) that should only be available to certain entities.

Similarly, the above migration approach could support usage models that, in effect, liberate an individual's computing environment from any particular workstation. For example, the Internet Suspend/Resume (ISR) project described at http://info.pittsburgh.intel-research.net/project/isr/ pertains to an "approach to mobile computing in which a user's computing environment follows the user [across workstations] as he or she travels." The ISR project describes one example deployment of a transportable computing environment as follows:

> For example, imagine a telecommuter who works from home in the morning and at the office in the afternoon. After completing a morning's work, the user clicks "suspend" on the home machine and begins to travel to the office. While the user is en route, the state of the user's computing environment is also en route, through the network, to the machine in the user's office. When the telecommuter arrives at the office, the office machine is presenting the same environment that the user left at home: the same applications and files are open, the windows are all in the expected places, and the cursor is in the appropriate location. Such a model and similar models could use vTPM migration to support transportable, TPM-protected computing environments, such as an environment that includes a TPM-protected OS, TPM-protected applications, and/or TPM-protected data.

8.0—Conclusion

This disclosure describes a generalized framework for virtualization of security coprocessors such as TPMs. An example embodiment uses a TPM to enable secure virtual TPM operation. Disclosed embodiments allow multiple VMs to use TPM functionality without requiring multiple dedicated hardware TPMs, without requiring modification to the software within a VM, and without requiring modification to remote entities that interact with a TPM or vTPM-protected system. According to the present disclosure, a virtual TPM can measure the OS and applications in a VM to provide attestation to remote entities. Moreover, a virtual TPM can attest to a VM's state for a hardware TPM challenger, even though the hardware TPM and the challenger may utilize only the functionality described in the current TPM specifications, such as the TPM Version 1.2 Design Specification referenced above. The guest OS in a VM may remain unaware that a hardware TPM is being shared, and trust relationships are not required between the VMs within a system.

The disclosed framework may also facilitate the development of secure, software custom cryptographic subsystems which, if implemented in hardware, would be cost prohibitive. Virtual TPMs enable the combination of isolation created by VM technology with TPM functionality that provides hardware-based secure storage and attestation. Custom cryptographic subsystems enable richer functionality than that of the TPM for providing access controls and cryptographic protocols. This disclosure includes embodiments illustrating examples of how the framework can be used in accordance with different security and performance tradeoffs, while ensuring virtualization transparency. This means that applications do not need to treat TPM access from within VMs differently than TPM access on platforms without virtualization. For instance, applications may use the same APIs to communicate with DMs as they would to communicate with physical security coprocessors.

This disclosure also describes additional hardware TPM features for enabling simpler, optimized TPM virtualization. In addition, this disclosure describes mechanisms for remotely provisioning and deploying virtual TPMs, and for migrating virtual TPMs between platforms.

As indicated above, different embodiments may rely more or less on a hardware TPM to protect data. For instance, all keys may be stored in a hardware TPM, or for increased flexibility and/or performance, virtual keys can be created and used by the vTPM software, and the virtual keys may not be stored in or directly protected by the hwTPM. Private keys belonging to or generated by the virtual TPM may not be operated on by the hardware TPM, in that the hardware TPM may not use those private keys to perform cryptographic operations. Instead, the virtual TPM may use the host processor and cryptographic software to perform cryptographic operations with its private keys. To do this, the virtual TPM service may store its private keys in protected host memory. However, while the private key is not in use, the virtual TPM service may use hardware TPM features to wrap the key to its software configuration.

These options may allow the vTPM to encrypt, decrypt, sign, and verify objects in the vTPM software with much higher performance than may be provided by a hardware TPM. These options may thus be preferred for bulk encryption or use in performance-sensitive server environments, for instance. However, a tradeoff for added performance is that virtual keys may be permanently compromised if a vTPM is compromised.

In light of the principles and example embodiments described and illustrated herein, it will be recognized that the illustrated embodiments can be modified in arrangement and detail without departing from such principles. For example, virtual TPMs have been described in connection with VMs, but alternative embodiments also include vTPMs used in connection with other types of system subdivisions, such as partitions within a server or group of servers that share a hardware TPM. For instance, virtual TPMs may be used in a four-processor system that is partitioned into two logical two-processor systems. The teachings herein could also be used to provide a logical TPM to one or more service coprocessors, or to one or more other types of independent processing elements on a hardware platform.

Furthermore, alternative embodiments include vTPM services that do not emulate a hardware TPM, but do extend and/or amplify the capabilities of a hardware TPM (e.g., by providing more PCRs, more storage, etc.). Alternative embodiments also include a virtual TPM service running on top of a secure OS, on top of a managed run-time environment (MRTE), in a service processor or coprocessor, in a system management mode (SMM) of a platform, etc. Instead of or in addition to providing virtual TPMs, additional embodiments provide other kinds of emulated security coprocessors.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. At least one non-transitory machine-readable storage medium including instructions that if executed cause a first processing system to:
    create a first virtual trusted platform module associated with a first virtual machine of the first processing system;
    facilitate creation of a credential for the first virtual trusted platform module, wherein the credential is to be stored in a first storage location;
    enable a remote challenger to attest the first virtual machine using integrity evidence cryptographically linked to the first virtual trusted platform module; and
    migrate the first virtual trusted platform module to a distinct second processing system, the first virtual trusted platform module migration to send a state of the first virtual trusted platform module to the distinct second processing system, the state of the first virtual trusted platform module including an endorsement key.

2. The at least one non-transitory machine-readable storage medium of claim 1, wherein the instructions if executed further cause the first processing system to delete information associated with the first virtual trusted platform module from the first processing system.

3. The at least one non-transitory machine-readable storage medium of claim 1, wherein the credential comprises an endorsement key for the first virtual trusted platform module.

4. The at least one machine-readable storage medium of claim 3, wherein the instructions if executed further cause the first processing system to:
    generate a platform credential for the first virtual trusted platform module; and
    store the platform credential in another storage location.

5. The at least one machine-readable storage medium of claim 1, wherein the instructions if executed further cause the first processing system to encrypt the state of the first virtual trusted platform module.

6. The at least one machine-readable storage medium of claim 5, wherein the instructions if executed further cause the first processing system to move the encrypted state to the distinct second processing system during the first virtual trusted platform module migration.

7. The at least one machine-readable storage medium of claim 1, wherein the instructions if executed further cause the first processing system to delete a record of the first virtual trusted platform module from the first processing system after the first virtual trusted platform module migration.

8. The at least one non-transitory machine-readable storage medium of claim 1, wherein the first processing system comprises a physical trusted platform module.

9. The at least one non-transitory machine-readable storage medium of claim 1, wherein the distinct second processing system is physically remote from the first processing system, wherein the first processing system comprises a home computer of a user and the distinct second processing system comprises a work computer of the user.

10. A system comprising:
a first processing system;
first hardware logic of the first processing system to support creation of a first virtual machine for the first processing system;
second hardware logic of the first processing system to create a first virtual trusted platform module for the first virtual machine;
third hardware logic of the first processing system to facilitate creation of a credential for the first virtual trusted platform module and store the credential in a first storage location;
fourth hardware logic of the first processing system to enable a remote challenger to attest the first virtual machine using integrity evidence cryptographically linked to the first virtual trusted platform module; and
fifth hardware logic of the first processing system to migrate the first virtual trusted platform module to a distinct second processing system, the first virtual trusted platform module migration to send a state of the first virtual trusted platform module to the distinct second processing system, the state of the first virtual trusted platform module including an endorsement key.

11. The system of claim 10, further comprising a first physical trusted platform module (TPM) associated with the first processing system.

12. The system of claim 11, wherein the first processing system is to use the first physical TPM to support the first virtual trusted platform module.

13. The system of claim 11, wherein the second hardware logic is to configure a partition with virtual trusted platform capability.

14. The system of claim 13, wherein the partition comprises a virtual machine.

15. The system of claim 10, wherein the first processing system is physically remote from the distinct second processing system, the distinct second processing system comprising the remote challenger.

16. A method comprising:
creating a virtual trusted platform module for a virtual machine of a first processing system;
facilitating creation of a credential for the virtual trusted platform module, and storing the credential in a first storage location;
enabling a remote challenger to attest the virtual machine using integrity evidence cryptographically linked to the virtual trusted platform module; and
migrating the virtual trusted platform module to a distinct second processing system coupled to the first processing system, the virtual trusted platform module migration to send a state of the virtual trusted platform module to the distinct second processing system, the state of the virtual trusted platform module including an endorsement key.

17. The method of claim 16, further comprising generating, based on the endorsement key for the virtual trusted platform module, the credential for the virtual trusted platform module, the credential comprising an endorsement credential for the virtual trusted platform module.

18. The method of claim 16, further comprising generating a platform credential for the virtual trusted platform module, and storing the platform credential in another storage location.

19. The method of claim 16, further comprising encrypting the state of the virtual trusted platform module.

20. The method of claim 19, further comprising:
moving the encrypted state to the distinct second processing system during the virtual trusted platform module migration; and
deleting a record of the virtual trusted platform module from the first processing system after the virtual trusted platform module migration.

* * * * *